United States Patent
Sohn

(10) Patent No.: US 11,500,393 B2
(45) Date of Patent: Nov. 15, 2022

(54) CONTROL METHOD OF ROBOT SYSTEM

(71) Applicant: LG ELECTRONICS INC., Seoul (KR)

(72) Inventor: Byungkuk Sohn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/978,625

(22) PCT Filed: Jan. 3, 2019

(86) PCT No.: PCT/KR2019/000080
§ 371 (c)(1),
(2) Date: Sep. 4, 2020

(87) PCT Pub. No.: WO2020/141635
PCT Pub. Date: Jul. 9, 2020

(65) Prior Publication Data
US 2021/0365046 A1 Nov. 25, 2021

(51) Int. Cl.
*G01C 22/00* (2006.01)
*G05D 1/02* (2020.01)
*B60W 60/00* (2020.01)
*B66F 9/06* (2006.01)

(52) U.S. Cl.
CPC ..... *G05D 1/0297* (2013.01); *B60W 60/00256* (2020.02); *B66F 9/063* (2013.01); *B60W 2420/42* (2013.01); *B60W 2556/60* (2020.02)

(58) Field of Classification Search
CPC ........... G05D 1/00; G05D 1/02; G05D 1/021; G05D 1/0287; G05D 1/0291; G05D 1/0297; B60W 60/00; B60W 60/001; B60W 60/0025; B60W 60/00256; B60W 2556/00; B60W 2556/45; B60W 2556/60; B60W 2420/00; B60W 2420/42; B66F 9/00; B66F 9/06; B66F 9/063
See application file for complete search history.

(56) References Cited

U.S. PATENT DOCUMENTS

| | | | | |
|---|---|---|---|---|
| 10,493,624 | B1 * | 12/2019 | Nabat | B25J 13/085 |
| 2013/0186999 | A1 | 7/2013 | Huber | |
| 2016/0320774 | A1 | 11/2016 | Kuhara | |
| 2017/0282371 | A1 * | 10/2017 | Erhart | G06Q 30/016 |
| 2017/0336780 | A1 * | 11/2017 | Wise | B65G 67/04 |

(Continued)

FOREIGN PATENT DOCUMENTS

| CN | 109003204 A | * 12/2018 |
|---|---|---|
| KR | 10-2013-0068603 A | 6/2013 |

(Continued)

*Primary Examiner* — Adam M Alharbi
(74) *Attorney, Agent, or Firm* — Birch, Stewart, Kolasch & Birch, LLP

(57) ABSTRACT

Disclosed is a method of controlling a robot system, including receiving user input including a request for a predetermined service, by a first robot, transmitting information based on the user input to a server, by the first robot, identifying a support robot for supporting a task corresponding to the service request, by the server, making a request to the second robot identified to be the support robot for the task, by the server, and performing the task, by the second robot, wherein the first robot is different from the second robot.

14 Claims, 25 Drawing Sheets

(56) References Cited

U.S. PATENT DOCUMENTS

| | | | |
|---|---|---|---|
| 2018/0203462 A1* | 7/2018 | Sugiyama | G05D 1/0274 |
| 2019/0129445 A1* | 5/2019 | Koo | B25J 9/1664 |
| 2019/0310656 A1* | 10/2019 | Suzuki | G05D 1/0088 |
| 2019/0369641 A1* | 12/2019 | Gillett | G05D 1/0027 |
| 2020/0133305 A1* | 4/2020 | Gariepy | B60L 58/12 |
| 2020/0282549 A1* | 9/2020 | Torii | B25J 9/1682 |

FOREIGN PATENT DOCUMENTS

| | | |
|---|---|---|
| KR | 10-1668078 B1 | 10/2016 |
| KR | 10-2018-0080499 A | 7/2018 |

* cited by examiner

CONTROL METHOD OF ROBOT SYSTEM

CROSS-REFERENCE TO RELATED APPLICATION

This application is the National Phase of PCT International Application No. PCT/KR2019/000080 filed on Jan. 3, 2019, the entirety of which is hereby expressly incorporated by reference into the present application.

TECHNICAL FIELD

The present disclosure relates to a robot system and a method of controlling the same, and more particularly to a robot system capable of performing cooperative work using a plurality of robots and providing various services and a method of controlling the same.

BACKGROUND ART

Robots have been developed for industrial use to administrate some parts of factory automation. Recently, the application fields of robots have further expanded, leading to the development of medical robots, aerospace robots, etc. and the manufacture of robots used in general homes for domestic uses. Among such robots, an autonomous mobile robot is referred to as a mobile robot.

With the increase in the use of robots, the demand for robots capable of providing various types of information, entertainment, and services in addition to the repeated performance of simple functions has increased.

Accordingly, robots for use in a home, stores, and public facilities so as to communicate with people are being developed.

In addition, services using a mobile robot that is capable of autonomously traveling have been proposed. For example, the cited reference (Korean Patent Application Publication No. 10-2008-0090150, Published on Oct. 8, 2008) proposes a service robot capable of providing a service based on a current position thereof while moving in a service area, a service system using the service robot, and a method of controlling the service system using the service robot.

However, although the number and type of proposed robots increase, the operation and service that is capable of being performed by a single robot has been intensively researched and developed.

Therefore, there is a need for a system for cooperation between robots that is capable of providing various services to customers using a plurality of robots and that is improved in terms of cost and efficiency.

DISCLOSURE

Technical Problem

It is an object of the present disclosure to provide a robot system capable of providing various services using a plurality of robots and a method of controlling the same.

It is another object of the present disclosure to provide a low-cost, high-efficiency robot system capable of minimizing intervention of an administrator and a method of controlling the same.

It is another object of the present disclosure to provide a robot system capable of efficiently providing the optimal service using different types of robots and a method of controlling the same.

It is another object of the present disclosure to provide a robot system capable of selecting a combination suitable for the type of the service and a place at which a service is provided and providing the service using a minimum number of robots and a method of controlling the same.

It is another object of the present disclosure to provide a robot system capable of effectively administrating a plurality of robots and a method of controlling the same.

It is another object of the present disclosure to provide a robot system capable of using data acquired through a plurality of robots and a method of controlling the same.

It is a further object of the present disclosure to provide a robot system operatively associated with an external server to provide various services and a method of controlling the same.

Technical Solution

In accordance with an aspect of the present disclosure, the above and other objects can be accomplished by the provision of a robot system and a method of controlling the same, wherein a plurality of robots cooperates with each other and provides various services. In particular, different types of robots can be used to provide the optimal service satisfying the request of a customer.

In accordance with an aspect of the present disclosure, the above and other objects can be accomplished by the provision of a method of controlling a robot system, including receiving user input including a request for a predetermined service, by a first robot, transmitting information based on the user input to a server, by the first robot, identifying a support robot for supporting a task corresponding to the service request, by the server, making a request to the second robot identified to be the support robot for the task, by the server, and performing the task, by the second robot, wherein the first robot and the second robot are different types. For example, the first robot can be a guide robot for guiding a user to a predetermined destination, and the second robot can be a porter robot that moves while carrying a load of the user.

The server can select the support robot among a plurality of robots based on at least one of whether the robots currently perform tasks, distances between the robots and the first robot, or a time at which the robots are expected to finish current tasks, and thus can select a support robot suitable for performing a task corresponding to the service and can efficiently administrate robots.

In accordance with another aspect of the present disclosure, the above and other objects can be accomplished by the provision of a method of controlling a robot system, including receiving input including a user request, by a first robot, calling a different type of second robot, by the first robot, and performing a task corresponding to the user request, by the second robot.

In this case, the second robot for performing the task can be identified among a plurality of robots according to a predetermined reference including at least one of whether a task is currently performed, a distance with a position of the first robot, or a time at which a current task is expected to be finished. The first robot can receive user speech input or touch input corresponding to the user request or receiving a signal including the user request from the server.

In accordance with another aspect of the present disclosure, the above and other objects can be accomplished by the provision of a method of controlling a robot system, which provides a service after the second robot moves to a position at which the first robot is positioned when the second robot selected as the support robot is positioned in a place that is not a place in which the service is provide or the service is started.

The second robot can report task completion to the first robot by the second robot after the task is finished, and the sever can update data corresponding to the first and second robots based on the report on the task completion, and thus can efficiently administrate robots and can use data acquired from the robots.

In some embodiments, the first robot can identify load of the user based on an image acquired through an image acquisition unit.

In this case, the first robot can transmit information on the identified load to the server, and the server can select a type and number of the support robots based on the identified load, and thus can select a support robot suitable for performing a task corresponding to the service and can efficiently administrate robots.

The first robot can select the type and number of the support robots directly or based on information on the identified load.

When the plurality of second robots performs the same task, any one of the plurality of second robots can travel autonomously and remaining robots can perform following travel of moving to follow the robot that travels autonomously.

Advantageous Effects

According to at least one of the embodiments of the present disclosure, various services can be provided using a plurality of robots, thereby improving use convenience.

According to at least one of the embodiments of the present disclosure, a low-cost, high-efficiency system for cooperation between robots capable of minimizing intervention of an administrator can be embodied.

According to at least one of the embodiments of the present disclosure, the optimal service can be efficiently provided using different types of robots.

According to at least one of the embodiments of the present disclosure, a combination suitable for the type of the service and a place at which a service is provided can be selected and the service can be provided using a minimum number of robots.

According to at least one of the embodiments of the present disclosure, a plurality of robots can be effectively administered and data acquired through a plurality of robots can be used.

In addition, according to at least one of the embodiments of the present disclosure, a robot system that is operatively associated to an external server to provide various services can be embodied.

Various other effects of the present disclosure will be directly or suggestively disclosed in the following detailed description of the disclosure.

BEST MODE

Reference will now be made in detail to embodiments, examples of which are illustrated in the accompanying drawings. However, the present disclosure can be embodied in many different forms and should not be construed as being limited to the embodiments set forth herein.

In the following description, with respect to constituent elements used in the following description, the suffixes "module" and "unit" are used or combined with each other only in consideration of ease in the preparation of the specification, and do not have or indicate mutually different meanings. Accordingly, the suffixes "module," "assembly" and "unit" can be used interchangeably.

It will be understood that although the terms "first," "second," etc., can be used herein to describe various components, these components should not be limited by these terms. These terms are only used to distinguish one component from another component.

Figure 1:
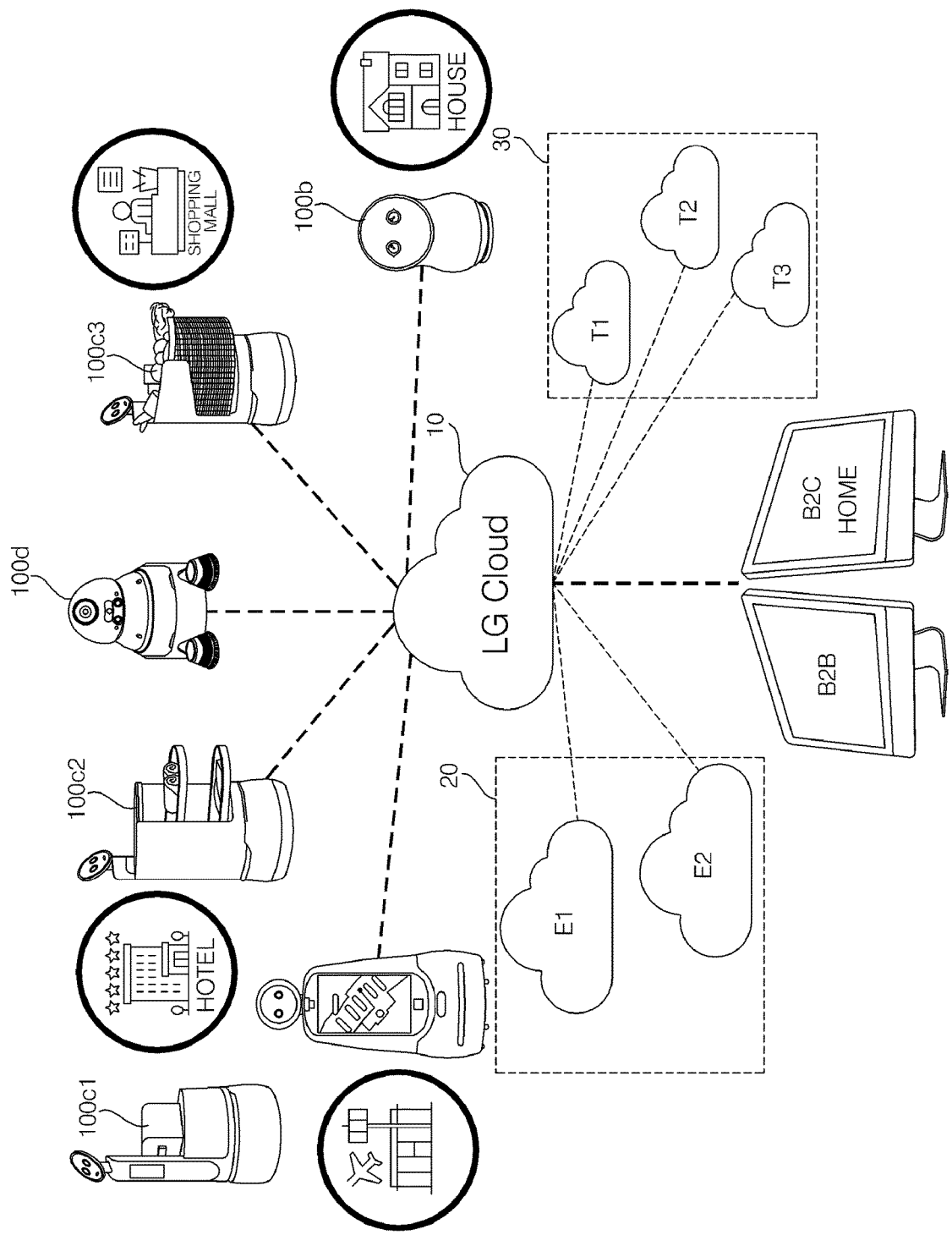
FIG. 1 is a diagram illustrating the construction of a robot system according to an embodiment of the present disclosure.

FIG. 1 is a diagram illustrating the configuration of a robot system according to an embodiment of the present disclosure.

Referring to FIG. 1, the robot system 1 according to an embodiment of the present disclosure can include one or more robots 100a, 100b, 100c1, 100c2, and 100c3 and can provide services at various places, such as an airport, a hotel, a big-box store, a clothing store, a logistics center, and a hospital. For example, the robot system 1 can include at least one of a guide robot 100a for providing guidance for a specific place, article, and service, a home robot 100b for interacting with a user at home and communicating with another robot or electronic device based on user input, delivery robots 100c1, 100c2, and 100c3 for delivering specific articles, or a cleaning robot 100d for performing cleaning while traveling autonomously.

In detail, the robot system 1 according to an embodiment of the present disclosure includes a plurality of robots 100a, 100b, 100c1, 100c2, 100c3, and 100d and a server 10 for administrating and controlling the plurality of robots 100a, 100b, 100c1, 100c2, 100c3, and 100d.

The server 10 can remotely monitor and control the state of the plurality of robots 100a, 100b, 100c1, 100c2, 100c3, and 100d, and the robot system 1 can provide more effective services using the plurality of robots 100a, 100b, 100c1, 100c2, 100c3, and 100d.

In more detail, the robot system 1 can include various types of robots 100a, 100b, 100c1, 100c2, 100c3, and 100d. Accordingly, services can be provided through the respective robots, and more various and convenient services can be provided through cooperation between the robots.

The plurality of robots 100a, 100b, 100c1, 100c2, 100c3, and 100d and the server 10 can include a communication element that supports one or more communication protocols and can communicate with each other. In addition, the plurality of robots 100a, 100b, 100c1, 100c2, 100c3, and 100d and the server 10 can communicate with a PC, a mobile terminal, or another external server.

For example, the plurality of robots 100a, 100b, 100c1, 100c2, 100c3, and 100d and the server 10 can communicate with each other using a message queuing telemetry transport (MQTT) scheme.

Alternatively, the plurality of robots 100a, 100b, 100c1, 100c2, 100c3, and 100d and the server 10 can communicate with each other using a hypertext transfer protocol (HTTP) scheme.

In addition, the plurality of robots 100a, 100b, 100c1, 100c2, 100c3, and 100d and the server 10 can communicate with a PC, a mobile terminal, or another external server using the HTTP or MQTT scheme.

Depending on the cases, the plurality of robots 100a, 100b, 100c1, 100c2, 100c3, and 100d and the server can support two or more communication protocols, and can use the optimal communication protocol depending on the type of communication data or the type of device participating in communication.

The server 10 can be embodied as a cloud server, whereby a user can use data stored in the server 10 and a function or service provided by the server 10 using any of various devices, such as a PC or a mobile terminal, which is connected to the server 10. The cloud server 10 can be operatively connected to the robots 100a, 100b, 100c1, 100c2, 100c3, and 100d and can monitor and control the robots 100a, 100b, 100c1, 100c2, 100c3, and 100d to remotely provide various solutions and content.

The user can check or control information on the robots 100a, 100b, 100c1, 100c2, 100c3, and 100d in the robot system using the PC or the mobile terminal.

In the specification, the 'user' can be a person who uses a service through at least one robot, and can include an individual consumer who purchases or rents a robot and uses the robot in a home or elsewhere, managers and employees of a company that provides a service to an employee or a consumer using a robot, and consumers that use a service provided by such a company. Thus, the 'user' can include business-to-consumer (B2C) and business-to-business (B2B) cases.

The user can monitor the state and location of the robots 100a, 100b, 100c1, 100c2, 100c3, and 100d in the robot system and can administrate content and task schedules using the PC or the mobile terminal.

The server 10 can store and administrate information received from the robots 100a, 100b, 100c1, 100c2, 100c3, and 100d and other devices.

The server 10 can be a server that is provided by the manufacturer of the robots 100a, 100b, 100c1, 100c2, 100c3, and 100d or a company engaged by the manufacturer to provide services.

The system according to the present disclosure can be operatively connected to two or more servers.

For example, the server 10 can communicate with external cloud servers 20, such as E1 and E2, and with third parties 30 providing content and services, such as T1, T2, and T3. Accordingly, the server 10 can be operatively connected to the external cloud servers 20 and with third parties 30 and can provide various services.

The server 10 can be a control server for administrating and controlling the robots 100a, 100b, 100c1, 100c2, 100c3, and 100d.

The server 10 can collectively or individually control the robots 100a, 100b, 100c1, 100c2, 100c3, and 100d. In addition, the server 10 can group at least some of the robots 100a, 100b, 100c1, 100c2, 100c3, and 100d and can perform control for each group.

The server 10 can be configured as a plurality of servers, to which information and functions are distributed, or as a single integrated server.

Because the server 10 can be configured as a plurality of servers, to which information and functions are distributed, or as a single integrated server and can administrate the overall service using the robots, the server can be called a robot service delivery platform (RSDP).

FIGS. 2A to 2D are reference diagrams illustrating a robot service delivery platform included in the robot system according to the embodiment of the present disclosure.

Figure 2A:
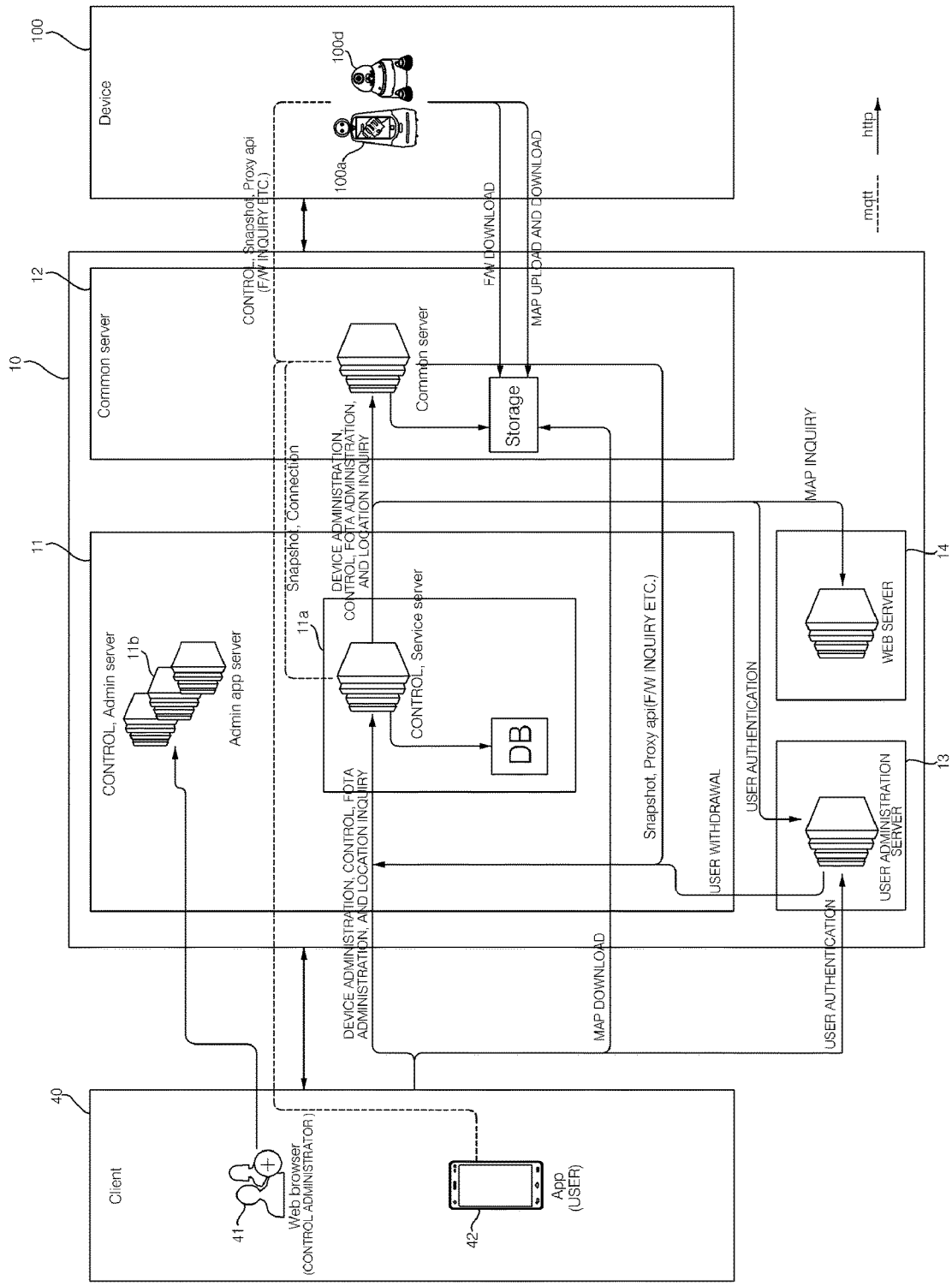
FIGS. 2A to 2D are reference diagrams illustrating a robot service delivery platform included in the robot system according to the embodiment of the present disclosure.

FIG. 2A illustrates a communication architecture of a robot service delivery platform according to an embodiment of the present disclosure.

Referring to FIG. 2A, the robot service delivery platform 10 can include one or more servers 11 and 12 and can administrate and control robots 100, such as the guide robot 100a or the cleaning robot 100d.

The robot service delivery platform 10 can include a control server 11 that communicates with a client 40 through a web browser 41 or an application 42 in a mobile terminal and administrates and controls the robots 100 and a device administration server 12 for relaying and administrating data related to the robot 100.

The control server 11 can include a control/service server 11a for providing a control service capable of monitoring the state and location of the robots 100 and administrating content and task schedules based on user input received from the client 40 and an administrator application server 11b that a control administrator is capable of accessing through the web browser 41.

The control/service server 11a can include a database, and can respond to a service request from the client 40, such as robot administration, control, firmware over the air (FOTA) upgrade, and location inquiry.

The control administrator can be capable of accessing the administrator application server 11b under the authority of the administrator, and the administrator application server can administrate functions related to the robot, applications, and content.

The device administration server 12 can function as a proxy server, can store metadata related to original data, and can perform a data backup function using a snapshot indicating the state of a storage device.

The device administration server 12 can include a storage for storing various data and a common server that communicates with the control/service server 11*a*. The common server can store various data in the storage, can retrieve data from the storage, and can respond to a service request from the control/service server 11*a*, such as robot administration, control, firmware over the air, and location inquiry.

In addition, the robots 100 can download map data and firmware data stored in the storage.

Because the control server 11 and the device administration server 12 are separately configured, it is not necessary to store data in the storage or to retransmit the data, which can be advantageous in terms of processing speed and time and effective administration can be easily achieved in terms of security.

The robot service delivery platform 10 is a set of servers that provide services related to the robot, and can mean all components excluding the client 40 and the robots 100 in FIG. 2A.

For example, the robot service delivery platform 10 can further include a user administration server 13 for administrating user accounts. The user administration server 13 can administrate user authentication, registration, and withdrawal.

In some embodiments, the robot service delivery platform 10 can further include a map server 14 for providing map data and data based on geographical information.

The map data received by the map server 14 can be stored in the control server 11 and/or the device administration server 12, and the map data in the map server 14 can be downloaded by the robots 100. Alternatively, the map data can be transmitted from the map server 14 to the robots 100 according to a request from the control server 11 and/or the device administration server 12.

The robots 100 and the servers 11 and 12 can include a communication element that supports one or more communication protocols and can communicate with each other.

Referring to FIG. 2A, the robots 100 and the servers 11 and 12 can communicate with each other using the MQTT scheme. The MQTT scheme is a scheme in which a message is transmitted and received through a broker, and is advantageous in terms of low power and speed. In the case in which the robot service delivery platform 10 uses the MQTT scheme, the broker can be constructed in the device administration server 12.

In addition, the robots 100 and the servers 11 and 12 can support two or more communication protocols, and can use the optimal communication protocol depending on the type of communication data or the type of a device participating in communication. FIG. 2A illustrates a communication path using the MQTT scheme and a communication path using the HTML scheme.

The servers 11 and 12 and the robots 100 can communicate with each other using the MQTT scheme irrespective of the type of the robots.

The robots 100 can transmit the current state thereof to the servers 11 and 12 through an MQTT session, and can receive remote control commands from the servers 11 and 12. For MQTT connection, a digital certificate of authentication, such as a personal key (issued for SCR generation), an X.509 certificate of authentication received at the time of robot registration, a certificate of device administration server authentication, or other authentication schemes can be used.

In FIG. 2A, the servers 11, 12, 13, and 14 are classified based on the functions thereof. However, the present disclosure is not limited thereto. Two or more functions can be performed by a single server, and a single function can be performed by two or more servers.

Figure 2B:
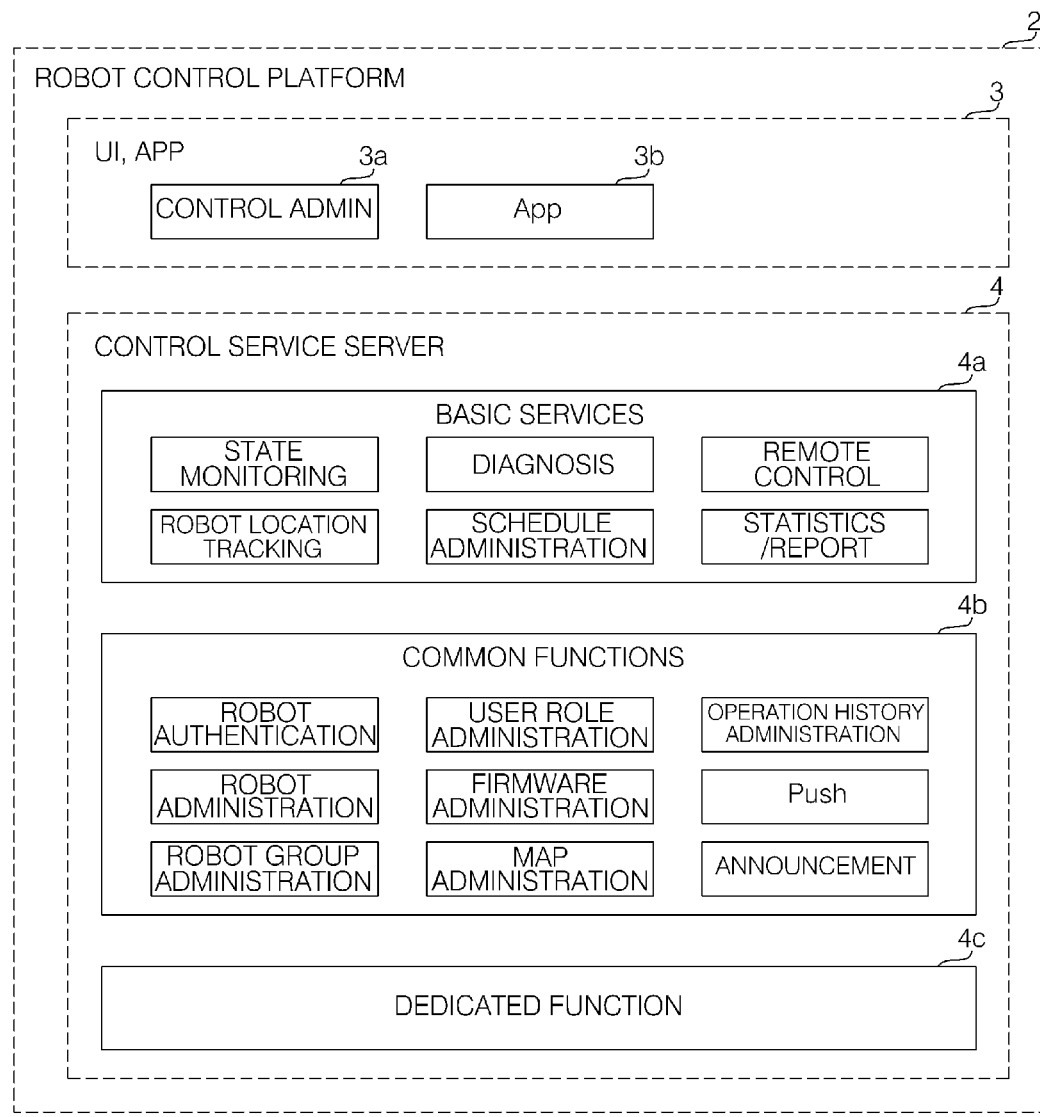

FIG. 2B illustrates a block diagram of the robot service delivery platform according to the embodiment of the present disclosure, and illustrates upper-level applications of a robot control platform related to robot control.

Referring to FIG. 2B, the robot control platform 2 can include a user interface 3 and functions/services 4 provided by the control/service server 11*a*).

The robot control platform 2 can provide a web site-based control administrator user interface 3*a* and an application-based user interface 3*b*.

The client 40 can use the user interface 3*b*, provided by the robot control platform 2 through a device used by the client 40 itself.

Figure 2C:
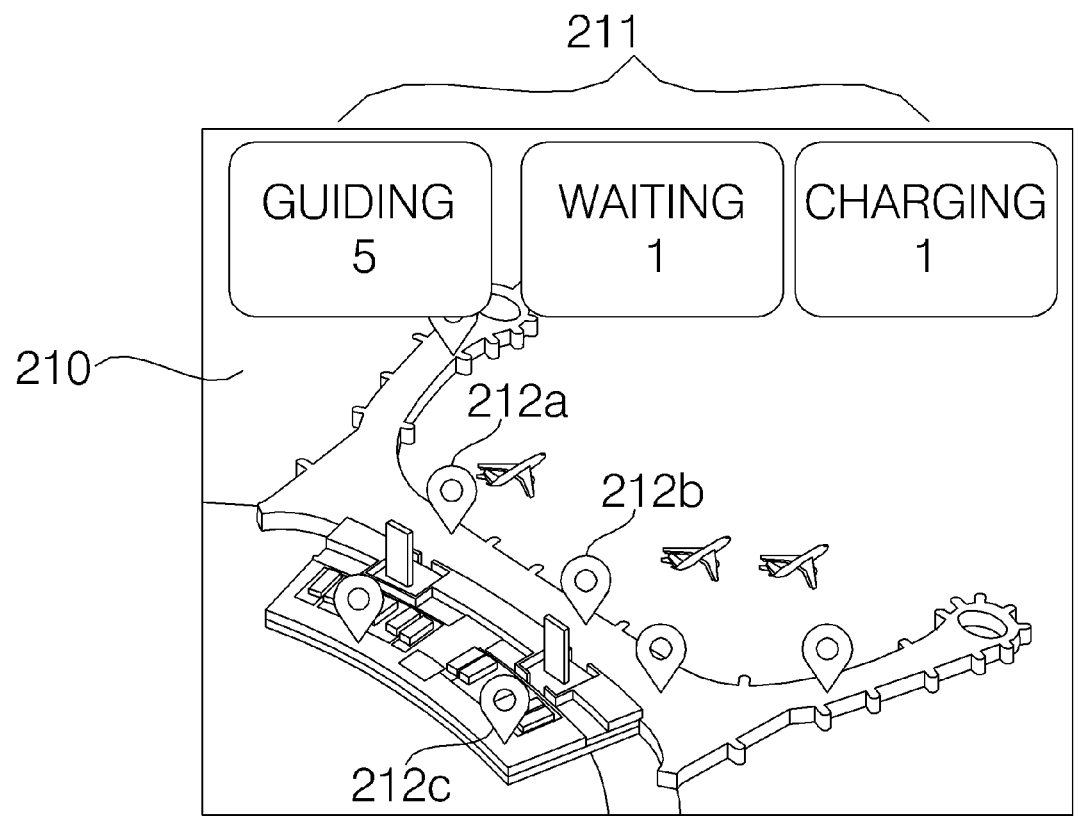
Figure 2D:
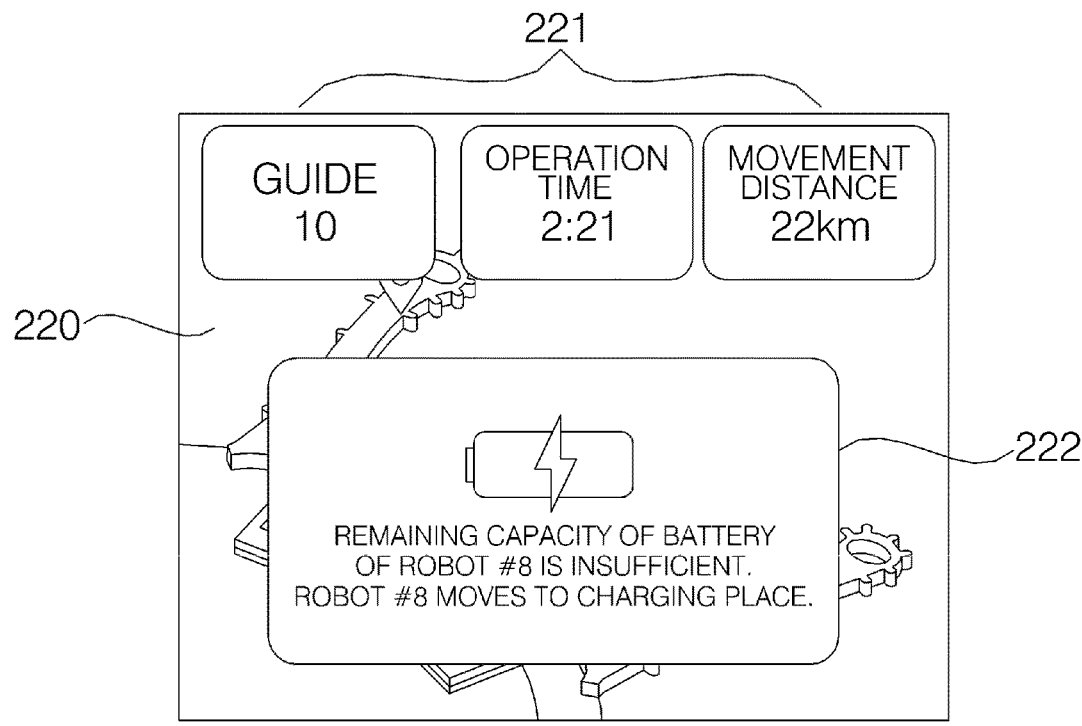

FIGS. 2C and 2D are diagrams showing an example of a user interface provided by the robot service delivery platform 10 according to the embodiment of the present disclosure.

FIG. 2C illustrates a monitoring screen 210 related to a plurality of guide robots 100*a*.

Referring to FIG. 2C, the user interface screen 210 provided by the robot service delivery platform can include state information 211 of the robots and location information 212*a*, 212*b*, and 212*c* of the robots.

The state information 211 can indicate the current state of the robots, such as guiding, waiting, or charging.

The location information 212*a*, 212*b*, and 212*c* can indicate the current location of the robots on a map screen. In some embodiments, the location information 212*a*, 212*b*, and 212*c* can be displayed using different shapes and colors depending on the state of the corresponding robot, and can thus provide a larger amount of information.

The user can monitor the operation mode of the robot and the current location of the robot in real time through the user interface screen 210.

FIG. 2D illustrates monitoring screens related to an individual guide robot 100*a*.

Referring to FIG. 2D, when the individual guide robot 100*a* is selected, a user interface screen 220 including history information 221 for a predetermined time period can be provided.

The user interface screen 220 can include current location information of the selected individual guide robot 100*a*.

The user interface screen 220 can further include notification information 222 about the separate guide robot 100*a*, such as the remaining capacity of a battery and movement thereof.

Referring to FIG. 2B, the control/service server 11*a* can include common units 4*a* and 4*b* including functions and services that are commonly applied to a plurality of robots and a dedicated unit 4*c* including specialized functions related to at least some of the plurality of robots.

In some embodiments, the common units 4*a* and 4*b* can be classified into basic services 4*a* and common functions 4*b*.

The common units 4*a* and 4*b* can include a state monitoring service for checking the state of the robots, a diagnostic service for diagnosing the state of the robots, a remote control service for remotely controlling the robots, a robot location tracking service for tracking the location of the robots, a schedule administration service for assigning, checking, and modifying tasks of the robots, a statistics/ report service capable of checking various statistical data and analysis reports, and the like.

The common units 4a and 4b can include a user role administration function of administrating the authority of a robot authentication function user, an operation history administration function, a robot administration function, a firmware administration function, a push function related to push notification, a robot group administration function of setting and administrating groups of robots, a map administration function of checking and administrating map data and version information, an announcement administration function, and the like.

The dedicated unit 4c can include specialized functions obtained by considering the places at which the robots are operated, the type of services, and the demands of customers. The dedicated unit 4c can mainly include a specialized function for B2B customers. For example, in the case of the cleaning robot 100d, the dedicated unit 4c can include a cleaning area setting function, a function of monitoring a state for each site, a cleaning reservation setting function, and a cleaning history inquiry function.

The specialized function provided by the dedicated unit 4c can be based on functions and services that are commonly applied. For example, the specialized function can also be configured by modifying the basic services 4a or adding a predetermined service to the basic services 4a. Alternatively, the specialized function can be configured by partially modifying the common function.

In this case, the basic service or the common function corresponding to the specialized function provided by the dedicated unit 4c can be removed or inactivated.

Figure 3:
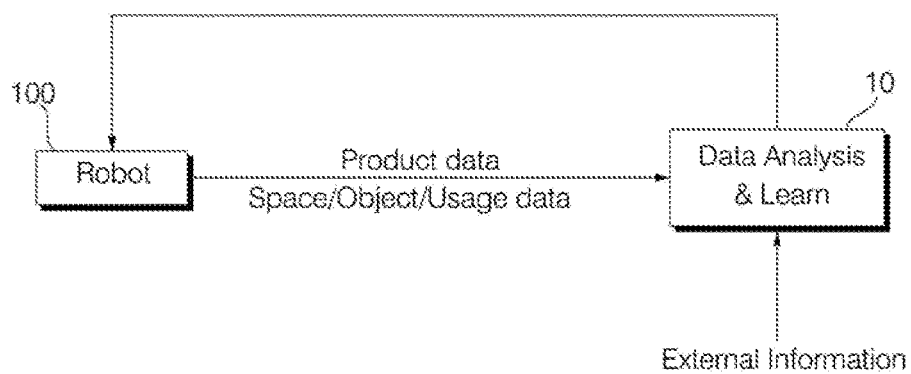
FIG. 3 is a reference diagram illustrating learning using data acquired by a robot according to an embodiment of the present disclosure.

FIG. 3 is a reference view illustrating learning using data acquired by a robot according to an embodiment of the present disclosure.

Referring to FIG. 3, product data acquired through the operation of a predetermined device, such as a robot 100, can be transmitted to the server 10.

For example, the robot 100 can transmit data related to a space, an object, and usage to the server 10.

Figure 7:
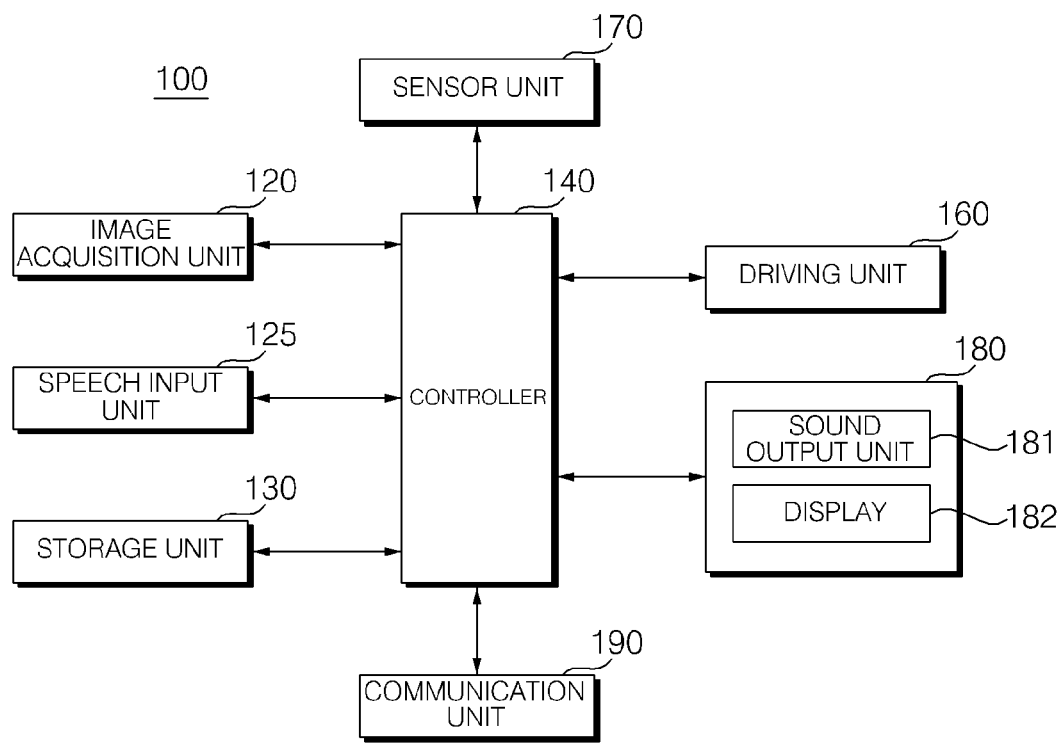
FIG. 7 illustrates an example of a simple internal block diagram of a robot according to an embodiment of the present disclosure.

Here, the data related to a space, an object, and usage can be data related to recognition of a space and an object recognized by the robot 100 or can be image data of a space or object acquired by an image acquisition unit 120 (refer to FIG. 7).

In some embodiments, the robot 100 and the server 10 can include a software or hardware type artificial neural network (ANN) trained to recognize at least one of the attributes of a user, the attributes of speech, the attributes of a space, or the attributes of an object, such as an obstacle.

According to an embodiment of the present disclosure, the robot 100 and the server 10 can include a deep neural network (DNN) trained using deep learning, such as a convolutional neural network (CNN), a recurrent neural network (RNN), or a deep belief network (DBN). For example, the deep neural network (DNN), such as the convolutional neural network (CNN), can be installed in a controller 140 (refer to FIG. 7) of the robot 100.

The server 10 can train the deep neural network (DNN) based on the data received from the robot 100 and data input by a user, and can then transmit the updated data of the deep neural network (DNN) to the robot 100. Accordingly, the deep neural network (DNN) pertaining artificial intelligence included in the robot 100 can be updated.

The usage related data can be data acquired in the courses of use of a predetermined product, e.g., the robot 100, can include usage history data and sensing data acquired by a sensor unit 170 (refer to FIG. 7).

The trained deep neural network (DNN) can receive input data for recognition, can recognize the attributes of a person, an object, and a space included in the input data, and can output the result.

The trained deep neural network (DNN) can receive input data for recognition, and can analyze and train usage related data of the robot 100 and can recognize the usage pattern and the usage environment.

The data related to a space, an object, and usage can be transmitted to the server 10 through a communication unit 190 (refer to FIG. 7).

The server 10 can train the deep neural network (DNN) based on the received data, can transmit the updated configuration data of the deep neural network (DNN) to the robot 10, and can then update the data.

Accordingly, a user experience UX in which the robot 100 becomes smarter and evolves along with continual use thereof can be provided.

The robot 100 and the server 10 can also use external information. For example, the server 10 can synthetically use external information acquired from other service servers 20 and 30 associated therewith and can provide an excellent user experience UX.

The server 10 can receive a speech input signal from a user and can perform speech recognition. To this end, the server 10 can include a speech recognition module, and the speech recognition module can include an artificial neural network trained to perform speech recognition on input data and to output the speech recognition result.

In some embodiments, the server 10 can include a speech recognition server for speech recognition. In addition, the speech recognition server can also include a plurality of servers for performing assigned speech recognition procedure. For example, the speech recognition server can include an automatic speech recognition (ASR) server for receiving speech data and converting the received speech data to text data and a natural language processing (NLP) server for receiving the text data from the automatic speech recognition server, analyzing the received text data, and determining a speech command. Depending on the cases, the speech recognition server can further include a text to speech (TTS) server for converting the text speech recognition result output by the natural language processing server to speech data and transmitting the speech data to another server or device.

According to the present disclosure, because the robot 100 and/or the server 10 are capable of performing speech recognition, user speech can be used as input for controlling the robot 100.

According to the present disclosure, the robot 100 can actively provide information or output speech for recommending a function or a service first, and thus more various and active control functions can be provided to the user.

FIGS. 4, 5, and 6A to 6D are diagrams showing examples of robots according to embodiments of the present disclosure. The robots 100 can be disposed or can travel in specific spaces and can perform tasks assigned thereto.

Figure 4:
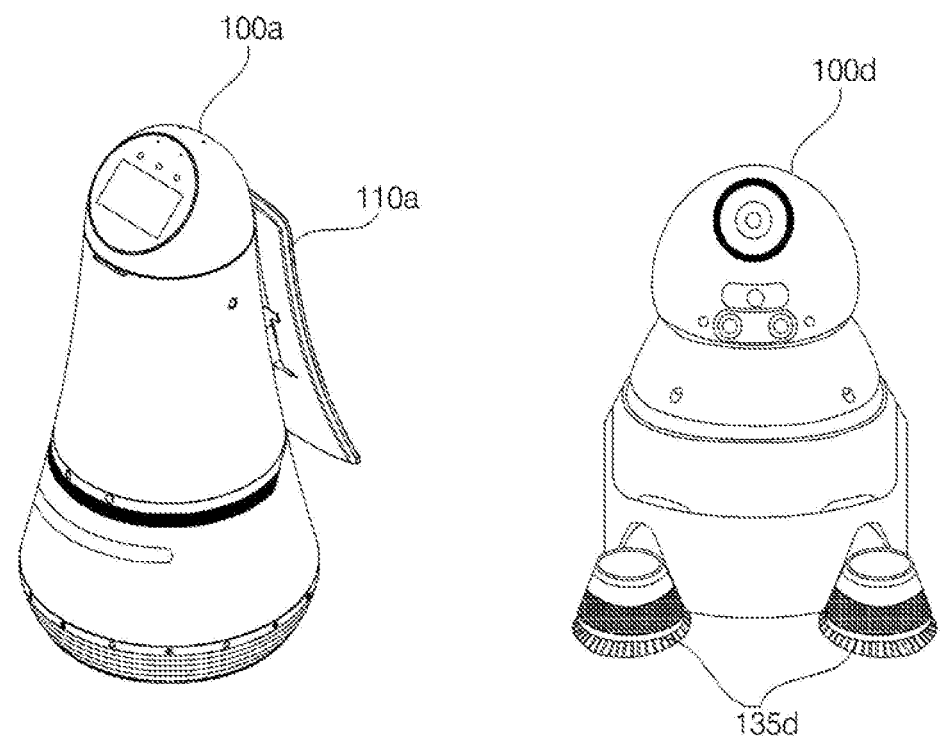
FIGS. 4, 5, and 6A to 6D are diagrams illustrating robots according to embodiments of the present disclosure.

FIG. 4 illustrates an example of mobile robots that are mainly used in a public place. The mobile robot is a robot that autonomously moves using wheels. Accordingly, the mobile robot can be a guide robot, a cleaning robot, a domestic robot, a guard robot. However, the present disclosure is not limited at to the type of the mobile robot.

FIG. 4 illustrates an example of a guide robot 100a and a cleaning robot 100d.

The guide robot 100a can include a display 110a and can display a predetermined image, such as a user interface screen.

The guide robot 100a can display a user interface (UI) image including events, advertisements, and guide information on the display 110a. The display 110a can be configured as a touchscreen and can also be used as an input element.

The guide robot 100a can receive user input, such as touch input or speech input, and can display information on an object or a place corresponding to the user input on a screen of the display 110a.

In some embodiments, the guide robot 100a can include a scanner for identifying a ticket, an airline ticket, a barcode, a QR code, and the like for guidance.

The guide robot 100a can provide a guidance service of directly guiding a user to a specific destination while moving to the specific destination in response to a user request.

The cleaning robot 100d can include a cleaning tool 135d, such as a brush, and can clean a specific space while autonomously moving.

The mobile robots 100a and 100d can perform assigned tasks while traveling in specific spaces. The mobile robots 100a and 100d can perform autonomous travel, in which the robots move while generating a path to a specific destination, or following travel, in which the robots follow people or other robots. To prevent a safety-related accident, the mobile robots 100a and 100d can travel while detecting and avoiding an obstacle based on image data acquired by the image acquisition unit 120 or sensing data acquired by the sensor unit 170 while moving.

Figure 5:
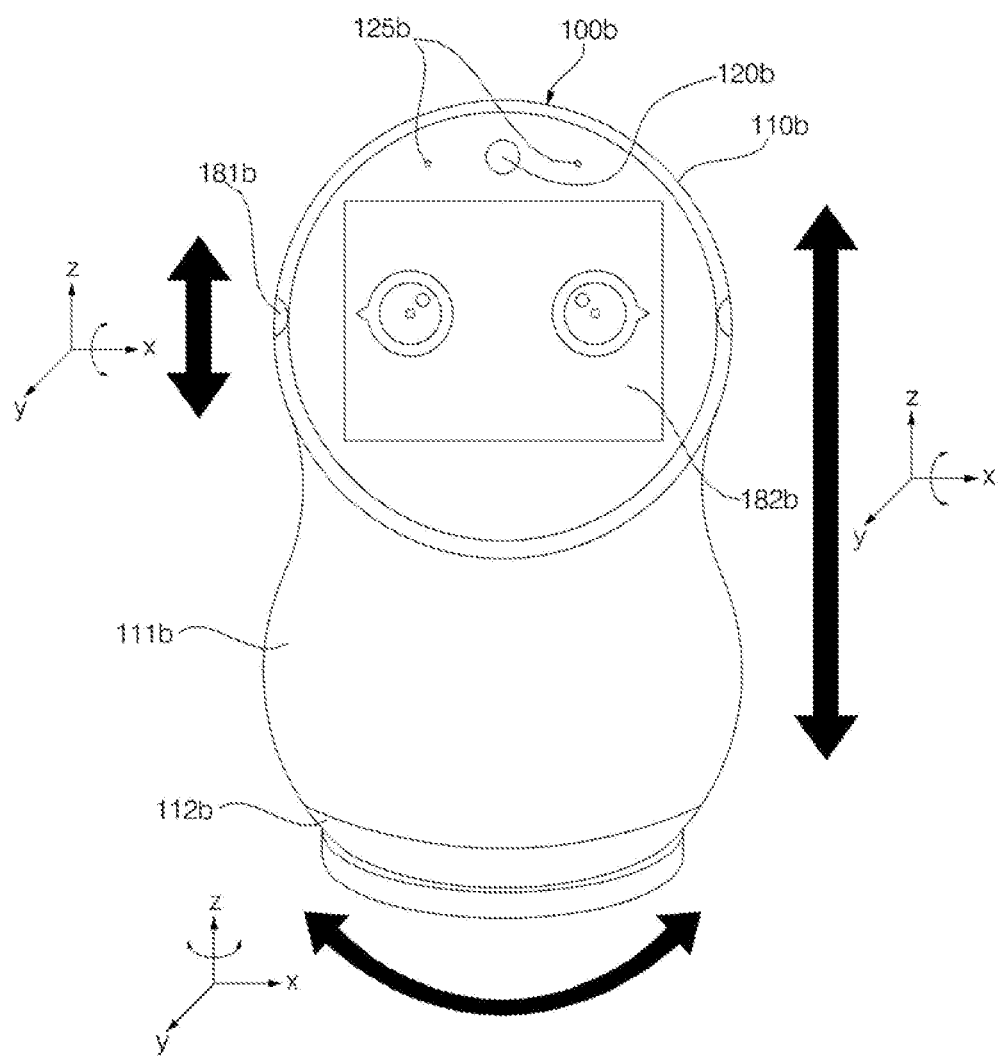
Figure 6A:
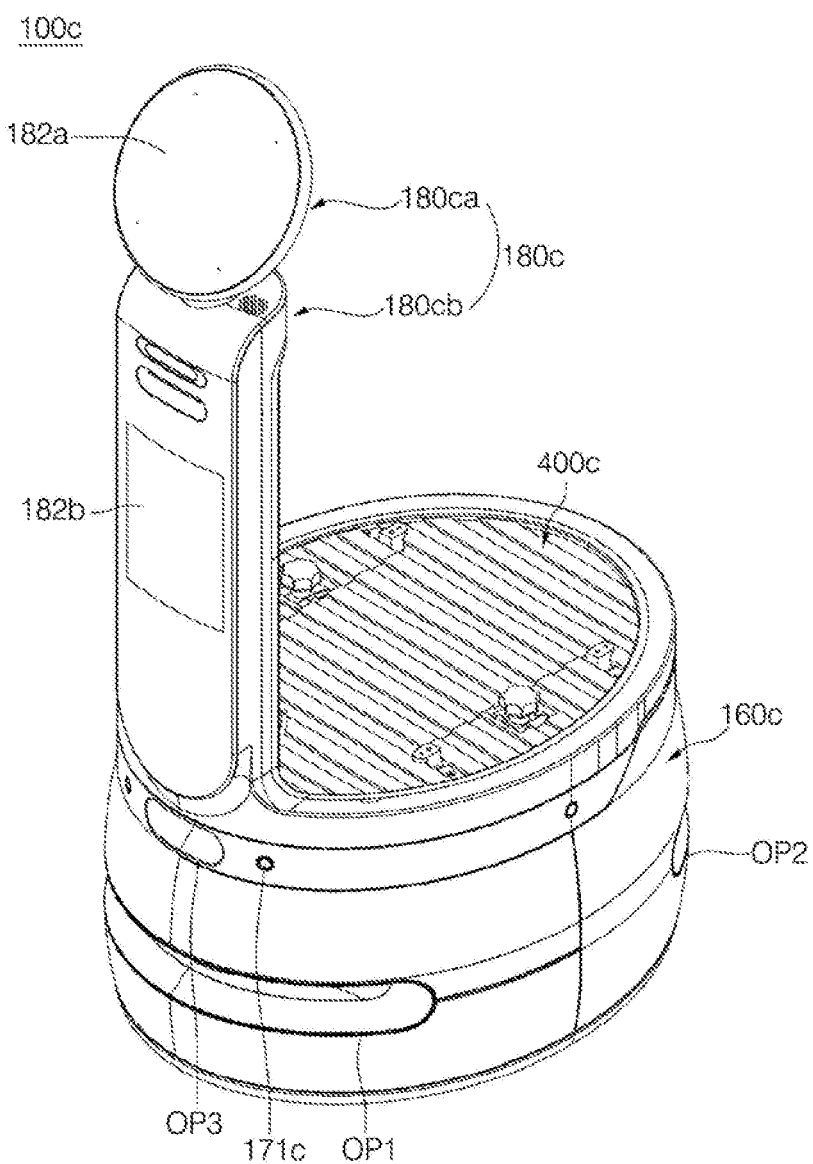
Figure 6B:
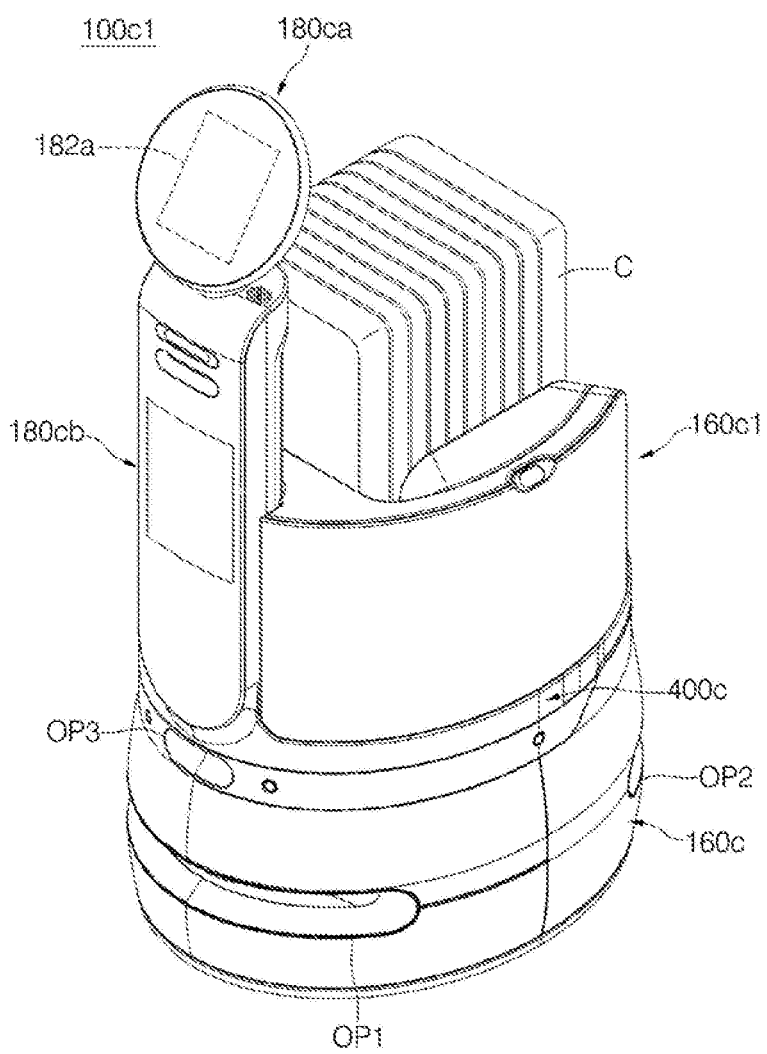
Figure 6C:
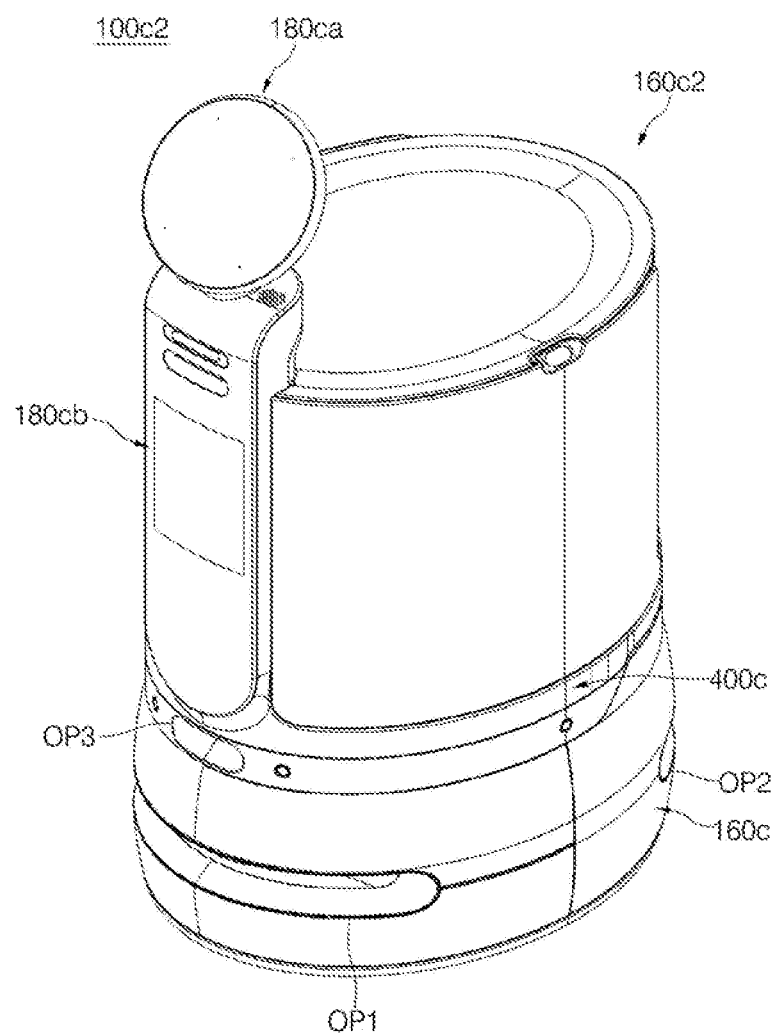
Figure 6D:
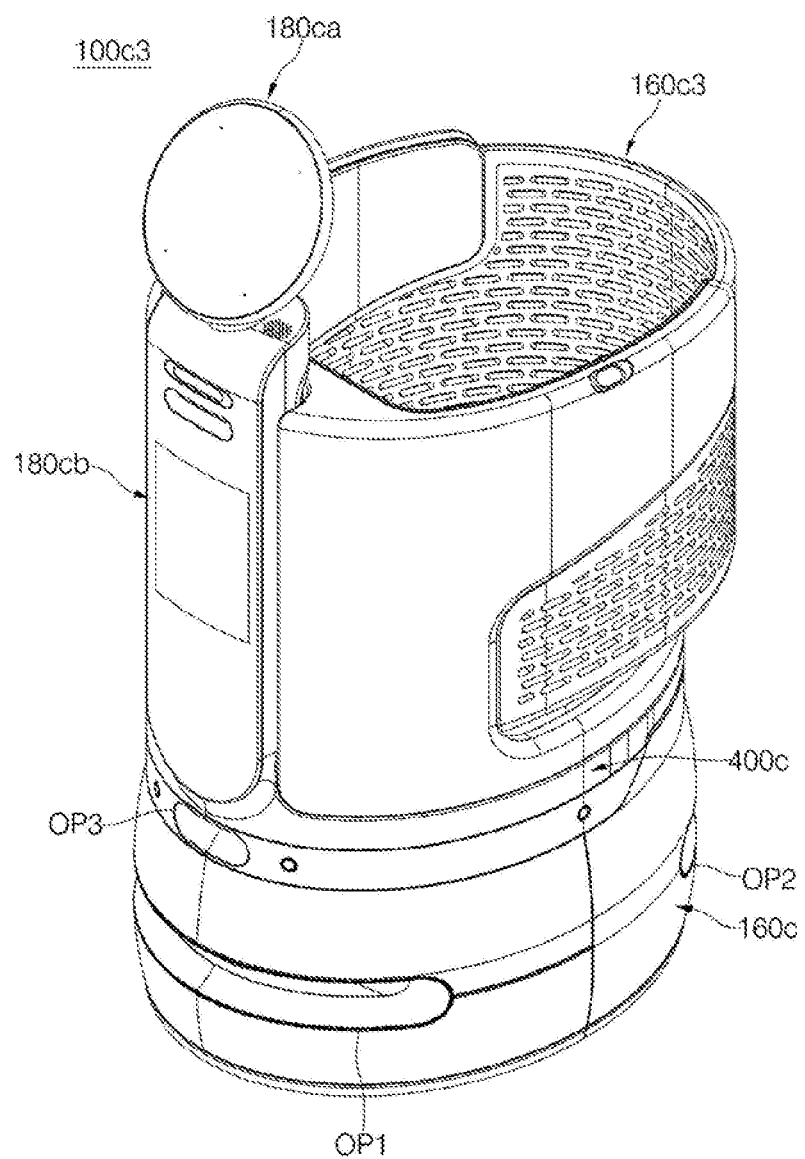

FIG. 5 is a front view illustrating an outer appearance of a home robot according to an embodiment of the present disclosure.

Referring to FIG. 5, the home robot 100b includes main bodies 111b and 112b for forming an outer appearance thereof and accommodating various components.

The main bodies 111b and 112b can include a body 111b for forming a space for various components included in the home robot 100b, and a support unit 112b disposed at the lower side of the body 111b for supporting the body 111b.

The home robot 100b can include a head 110b disposed at the upper side of the main bodies 111b and 112b. A display 182 for displaying an image can be disposed on a front surface of the head 110b.

In the specification, the forward direction can be a positive y-axis direction, the upward and downward direction can be a z-axis direction, and the leftward and rightward direction can be an x-axis direction.

The head 110b can be rotated about the x axis within a predetermined angular range.

Accordingly, when viewed from the front, the head 110b can nod in the upward and downward direction in the manner in which a human head nods in the upward and downward direction. For example, the head 110b can perform rotation and return within a predetermined range once or more in the manner in which a human head nods in the upward and downward direction.

In some embodiments, at least a portion of the front surface of the head 100b, on which the display 182 corresponding to the face of the human is disposed, can be configured to nod.

Thus, in the specification, although an embodiment in which the entire head 110b is moved in the upward and downward direction is described, unless particularly otherwise, the operation in which the head 110b nods in the upward and downward direction can be replaced by the operation in which at least a portion of the front surface of the head, on which the display 182 is disposed, nods in the upward and downward direction.

The body 111b can be configured to rotate in the leftward and rightward direction. That is, the body 111b can be configured to rotate at 360 degrees about the z axis.

In some embodiments, the body 111b can also be configured to rotate about the x axis within a predetermined angular range, and thus the body can move in the manner of bowing in the upward and downward direction. In this case, as the body 111b rotates in the upward and downward direction, the head 110b can also rotate about the axis about which the body 111b is rotated.

Thus, in the specification, the operation in which the head 110b nods in the upward and downward direction can include both the case in which the head 110b rotates about a predetermined axis in the upward and downward direction when viewed from the front and the case in which, as the body 111b nods in the upward and downward direction, the head 110b connected to the body 111b also rotates and thus nods.

The home robot 100b can include an image acquisition unit 120b for capturing an image of surroundings of the main bodies 111b and 112b, or an image of at least a predetermined range based on the front of the main bodies 111b and 112b.

The image acquisition unit 120b can capture an image of the surroundings of the main bodies 111b and 112b and an external environment and can include a camera module. A plurality of cameras can be installed at respective positions to improve photographing efficiency. In detail, the image acquisition unit 120b can include a front camera provided at the front surface of the head 110b for capturing an image of the front of the main bodies 111b and 112b.

The home robot 100b can include a speech input unit 125b for receiving user speech input.

The speech input unit 125b can include or can be connected to a processing unit for converting analog sound into digital data and can convert a user input speech signal to data to be recognized by the server 10 or the controller 140.

The speech input unit 125b can include a plurality of microphones for improving the accuracy of reception of user speech input and determining the location of a user.

For example, the speech input unit 125b can include at least two microphones.

The plurality of microphones (MIC) can be spaced apart from each other at different positions and can acquire and convert an external audio signal including a speech signal to an electrical signal.

At least two microphones, that is, input devices, can be required to estimate a sound source from which sound is generated and the orientation of the user, and as the physical distance between the microphones increases, resolution (angle) in detecting the direction increases. In some embodiments, two microphones can be disposed on the head 110b. Two microphones can be further disposed on the rear surface of the head 110b, and thus the location of the user in a three-dimensional space can be determined.

Sound output units 181b can be disposed on the left and right surfaces of the head 110b and can output predetermined information in the form of sound.

The outer appearance and configuration of the robot is exemplified in FIG. 5 and the present disclosure is not limited thereto. For example, the entire robot 110 can tilt or swing in a specific direction, differently from the rotational direction of the robot 100 exemplified in FIG. 5.

FIGS. 6A to 6D are diagrams showing examples of delivery robots 100c, 100c1, 100c2, and 100c3 for delivering predetermined articles.

Referring to the drawings, the delivery robots 100c, 100c1, 100c2, and 100c3 can travel in an autonomous or following manner, each of the delivery robots can move to a predetermined place while carrying a load, an article, or a baggage C, and depending on the cases, each of the delivery robots can also provide a guidance service of guiding a user to a specific place.

The delivery robots 100c, 100c1, 100c2, and 100c3 can travel autonomously at a specific place and can provide guidance to a specific place or can deliver loads, such as baggage.

The delivery robots 100c, 100c1, 100c2, and 100c3 can follow a user while maintaining a predetermined distance from the user.

In some embodiments, each of the delivery robots 100c, 100c1, 100c2, and 100c3 can include a weight sensor for detecting the weight of a load to be delivered, and can inform the user of the weight of the load detected by the weight sensor.

A modular design can be applied to each of the delivery robots 100c, 100c1, 100c2, and 100c3 and can provide services optimized depending on the use environment and purpose.

For example, the basic platform 100c can include a traveling module 160c, which is in charge of traveling and includes a wheel and a motor, and a UI module 180c, which is in charge of interacting with a user and includes a display, a microphone, and a speaker.

Referring to the drawings, the traveling module 160c can include one or more openings OP1, OP2, and OP3.

The first opening OP1 can be formed in the traveling module 160c to allow a front lidar to be operable, and can be formed over the front to the side of the outer circumferential surface of the traveling module 160c.

The front lidar can be disposed in the traveling module 160c to face the first opening OP1. Accordingly, the front lidar can emit a laser through the first opening OP1.

The second opening OP2 can be formed in the traveling module 160c to allow a rear lidar to be operable, and can be formed over the rear to the side of the outer circumferential surface of the traveling module 160c.

The rear lidar can be disposed in the traveling module 160c to face the second opening OP2. Accordingly, the rear lidar can emit a laser through the second opening OP2.

The third opening OP3 can be formed in the traveling module 160c to allow a sensor disposed in the traveling module, such as a cliff sensor for detecting whether a cliff is present on a floor within a traveling area, to be operable.

A sensor can be disposed on the outer surface of the traveling module 160c. An obstacle sensor, such as an ultrasonic sensor 171c, for detecting an obstacle can be disposed on the outer surface of the traveling module 160c.

For example, the ultrasonic sensor 171c can be a sensor for measuring a distance between an obstacle and each of the delivery robots 100c, 100c1, 100c2, and 100c3 using an ultrasonic signal. The ultrasonic sensor 171a can detect an obstacle adjacent to each of the delivery robots 100c, 100c1, 100c2, and 100c3.

For example, a plurality of ultrasonic sensors 171c can be configured to detect obstacles adjacent to the delivery robots 100c, 100c1, 100c2, and 100c3 in all directions. The ultrasonic sensors 171c can be spaced apart from each other along the circumference of the traveling module 160c.

In some embodiments, the UI module 180c can include two displays 182a and 182b, and at least one of the two displays 182a and 182b can be configured in the form of a touchscreen and can also be used as an input element.

The UI module 180c can further include the camera of the image acquisition unit 120. The camera can be disposed on the front surface of the UI module 180c and can acquire image data of a predetermined range from the front of the UI module 180c.

In some embodiments, at least a portion of the UI module 180c can be configured to rotate. For example, the UI module 180c can include a head unit 180ca configured to rotate in the leftward and rightward direction and a body unit 180cb for supporting the head unit 180ca.

The head unit 180ca can rotate based on an operation mode and a current state of the delivery robots 100c, 100c1, 100c2, and 100c3.

The camera can be disposed at the head unit 180ca and can acquire image data of a predetermined range in a direction in which the head unit 180a is oriented.

For example, in the following travel mode in which the delivery robots 100c, 100c1, 100c2, and 100c3 follow a user, the head unit 180ca can rotate to face forwards. In the guide mode in which the delivery robots 100c, 100c1, 100c2, and 100c3 provide a guidance service of guiding a user to a predetermined destination while moving ahead of the user, the head unit 180ca can rotate to face backwards.

The head unit 180ca can rotate to face a user identified by the camera.

The porter robot 100c1 can further include a delivery service module 160c1 for accommodating a load as well as components of the basic platform 100c. In some embodiments, the porter robot 100c1 can include a scanner for identifying a ticket, an airline ticket, a barcode, a QR code, and the like for guidance.

The serving robot 100c2 can further include a serving service module 160c2 for accommodating serving articles as well as the components of the basic platform 100c. For example, serving articles in a hotel can correspond to towels, toothbrushes, toothpaste, bathroom supplies, bedclothes, drinks, foods, room service items, or other small electronic devices. The serving service module 160c2 can include a space for accommodating serving articles and can stably deliver the serving articles. The serving service module 160c2 can include a door for opening and closing the space for accommodating the serving articles, and the door can be manually and/or automatically opened and closed.

The cart robot 100c3 can further include a shopping cart service module 160c3 for accommodating customer shopping articles as well as the components of the basic platform 100c. The shopping cart service module 160c3 can include a scanner for recognizing a barcode, a QR code, and the like of a shopping article.

The service modules 160c1, 160c2, and 160c3 can be mechanically coupled to the traveling module 160c and/or the UI module 180c. The service modules 160c1, 160c2, and 160c3 can be conductively coupled to the traveling module 160c and/or the UI module 180 and can transmit and receive a signal. Accordingly, they can be organically operated.

To this end, the delivery robots 100c, 100c1, 100c2, and 100c3 can include a coupling unit 400c for coupling the traveling module 160c and/or the UI module 180 to the service modules 160c1, 160c2, and 160c3.

FIG. 7 is a schematic internal block diagram illustrating an example of a robot according to an embodiment of the present disclosure.

Referring to FIG. 7, the robot 100 according to the embodiment of the present disclosure can include a controller 140 for controlling an overall operation of the robot 100, a storage unit 130 for storing various data, and a communication unit 190 for transmitting and receiving data to and from another device such as the server 10.

The controller 140 can control the storage unit 130, the communication unit 190, a driving unit 160, a sensor unit 170, and an output unit 180 in the robot 100, and thus can control an overall operation of the robot 100.

The storage unit 130 can store various types of information required to control the robot 100 and can include a volatile or nonvolatile recording medium. The recording medium can store data readable by a microprocessor and can include, for example, a hard disk drive (HDD), a solid state disk (SSD), a silicon disk drive (SDD), a ROM, a RAM, a CD-ROM, a magnetic tape, a floppy disk, and an optical data storage device.

The controller 140 can control the communication unit 190 to transmit the operation state of the robot 100 or user input to the server 10 or the like.

The communication unit 190 can include at least one communication module, can connect the robot 100 to the Internet or to a predetermined network, and can communicate with another device.

The communication unit 190 can be connected to a communication module provided in the server 10 and can process transmission and reception of data between the robot 100 and the server 10.

The robot 100 according to the embodiment of the present disclosure can further include a speech input unit 125 for receiving user speech input through a microphone.

The speech input unit 125 can include or can be connected to a processing unit for converting analog sound to digital data and can convert a user input speech signal to data to be recognized by the server 10 or the controller 140.

The storage unit 130 can store data for speech recognition, and the controller 140 can process the user speech input signal received through the speech input unit 125, and can perform a speech recognition process.

The speech recognition process can be performed by the server 10, not by the robot 100. In this case, the controller 140 can control the communication unit 190 to transmit the user speech input signal to the server 10.

Alternatively, simple speech recognition can be performed by the robot 100, and high-dimensional speech recognition such as natural language processing can be performed by the server 10.

For example, upon receiving speech input including a predetermined keyword, the robot 100 can perform an operation corresponding to the keyword, and other speech input can be performed through the server 10. Alternatively, the robot 100 can merely perform wake word recognition for activating a speech recognition mode, and subsequent speech recognition of the user speech input can be performed through the server 10.

The controller 140 can perform control to enable the robot 100 to perform a predetermined operation based on the speech recognition result.

The robot 100 can include an output unit 180 and can display predetermined information in the form of an image or can output the predetermined information in the form of sound.

The output unit 180 can include a display 182 for displaying information corresponding to user command input, a processing result corresponding to the user command input, an operation mode, an operation state, and an error state in the form of an image. In some embodiments, the robot 100 can include a plurality of displays 182.

In some embodiments, at least some of the displays 182 can configure a layered structure along with a touchpad and can configure a touchscreen. In this case, the display 182 configuring the touchscreen can also be used as an input device for allowing a user to input information via touch as well as an output device.

The output unit 180 can further include a sound output unit 181 for outputting an audio signal. The sound output unit 181 can output an alarm sound, a notification message about the operation mode, the operation state, and the error state, information corresponding to user command input, and a processing result corresponding to the user command input in the form of sound under the control of the controller 140. The sound output unit 181 can convert an electrical signal from the controller 140 to an audio signal, and can output the audio signal. To this end, a speaker can be embodied.

In some embodiments, the robot 100 can further include an image acquisition unit 120 for capturing an image of a predetermined range.

The image acquisition unit 120 can capture an image of the periphery of the robot 100, an external environment, and the like, and can include a camera module. A plurality of cameras can be installed at predetermined positions for photographing efficiency.

The image acquisition unit 120 can capture an image for user recognition. The controller 140 can determine an external situation or can recognize a user (a guidance target) based on the image captured by the image acquisition unit 120.

When the robot 100 is a mobile robot such as the guide robot 100a, the delivery robots 100c, 100c1, 100c2, and 100c3, and the cleaning robot 100d, the controller 140 can perform control to enable the robot 100 to travel based on the image captured by the image acquisition unit 120.

The image captured by the image acquisition unit 120 can be stored in the storage unit 130.

When the robot 100 is a mobile robot such as the guide robot 100a, the delivery robots 100c, 100c1, 100c2, and 100c3, and the cleaning robot 100d, the robot 100 can further include a driving unit 160 for movement. The driving unit 160 can move a main body under the control of the controller 140.

The driving unit 160 can include at least one driving wheel for moving the main body of the robot 100. The driving unit 160 can include a driving motor connected to the driving wheel for rotating the driving wheel. Respective driving wheels can be installed on left and right sides of the main body and can be referred to as a left wheel and a right wheel.

The left wheel and the right wheel can be driven by a single driving motor, but as necessary, a left wheel driving motor for driving the left wheel and the right wheel driving motor for driving the right wheel can be separately installed. A direction in which the main body travels can be changed to the left or to the right based on a rotational speed difference between the left wheel and the right wheel.

An immobile robot 100 such as the home robot 100b can include a driving unit 160 for performing a predetermined action as described above with reference to FIG. 5.

In this case, the driving unit 160 can include a plurality of driving motors for rotating and/or moving the body 111b and the head 110b.

The robot 100 can include a sensor unit 170 including sensors for detecting various data related to an operation and state of the robot 100.

The sensor unit 170 can further include an operation sensor for detecting an operation of the robot 100 and outputting operation information. For example, a gyro sensor, a wheel sensor, or an acceleration sensor can be used as the operation sensor.

The sensor unit 170 can include an obstacle sensor for detecting an obstacle. The obstacle sensor can include an infrared sensor, an ultrasonic sensor, an RF sensor, a geomagnetic sensor, a position sensitive device (PSD) sensor, a cliff sensor for sensing whether a cliff is present on a floor within a traveling area, and a light detection and ranging (lidar).

The obstacle sensor senses an object, particularly an obstacle, present in the direction in which the mobile robot 100 travels (moves), and transfers information on the obstacle to the controller 140. In this case, the controller 140 can control the motion of the robot 100 depending on the position of the detected obstacle.

Figure 8A:
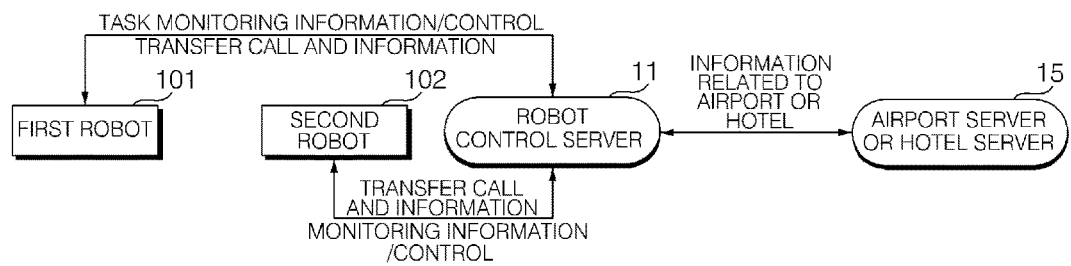
FIG. 8A is a reference diagram illustrating a system for cooperation between robots via a server according to an embodiment of the present disclosure.

FIG. 8A is a reference diagram illustrating a system for cooperation between robots via a server according to an embodiment of the present disclosure.

Referring to FIG. 8A, a first robot 101 and a second robot 102 can communicate with the control server 11.

The first robot 101 and the second robot 102 can transmit various types of information such as user requests and state information to the control server 11.

The control server 11 can control the first robot 101 and the second robot 102, can monitor the state of the first robot 101 and the second robot 102, and can monitor the storage of the first robot 101 and the second robot 102 and a current state of tasks assigned to the first robot 101 and the second robot 102.

The first robot 101 can receive user input for requesting a predetermined service. The first robot 101 can call another robot, can make a request to the called robot for task support, and can transmit information related to the user requests to the control server 11.

The control server 11 can check the current state information of robots and can identify a support robot for supporting the task requested by the first robot 101.

For example, the control server 11 can select the support robot among the plurality of robots based on at least one of whether the plurality of robots currently perform tasks, the distances between the robots and the first robot 101, or a time at which the robot is expected to finish the current task.

When the second robot 102 is selected as the support robot, the control server 11 can call the second robot 102, can make a request to the called second robot 102 for task support, and can transmit information related to the user requests to the second robot 102. The task support in response to the call of the first robot 101 can correspond to a duty of the second robot 102.

The control server 11 can monitor and control an operation of the second robot 102 that performs the duty.

Depending on the cases, the control server 11 can transmit information indicating that the second robot 102 supports the task to the first robot 101.

The control server 11 can transmit and receive information to and from a server 15 of a product or service provider such as an airport or a hotel. In this case, the control server 11 can receive information related to the airport or the hotel from the server 15 of the product or service provider such as the airport or the hotel, and can transfer information required to perform the task to the first robot 101 and/or the second robot 102.

Figure 8B:
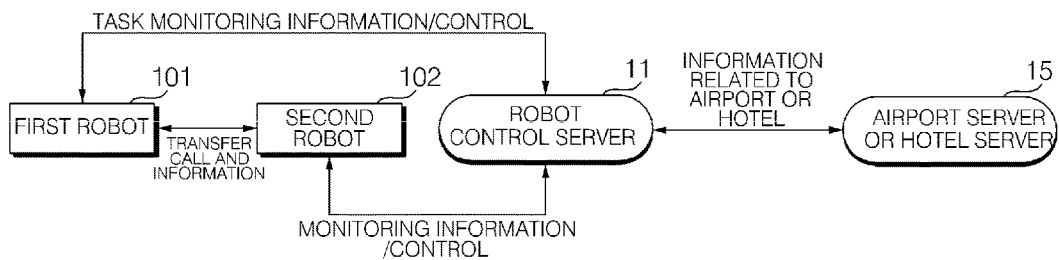
FIG. 8B is a reference diagram illustrating a system for cooperation between robots according to an embodiment of the present disclosure.

FIG. 8B is a reference view illustrating a system for cooperation between robots according to an embodiment of the present disclosure.

Referring to FIG. 8B, the first robot 101 can receive user input for requesting a predetermined service. The first robot 101 can directly call another robot and can make a request for task support based on the service requested by the user.

The first robot 101 can check the current state information of robots, and can identify a support robot for supporting the task. For example, the first robot 101 can select the support robot among the plurality of robots based on at least one of whether the robots currently perform tasks, the distances between the robots and the first robot 101, or a time at which the robots are expected to finish the current tasks.

To this end, the first robot 101 can receive state information of the robots from the control server 11.

Alternatively, the first robot 101 can transmit a signal for requesting the task support to other robots, and can select the support robot among the robots that transmit a response signal.

In this case, the signal transmitted by the first robot 101 can include information on the location of the first robot 101 or the place at which the service is provided and user requests. The response signal transmitted by the robots can include location information and state information of the robot.

The first robot 101 can check the information included in the response signal and can select the support robot based on a predetermined reference. According to the present embodiment, cooperation can be advantageously provided even if an error occurs in the server 10 or if communication between the server 10 and the first robot 101 is poor.

When the second robot 102 is selected as the support robot, the first robot 101 can call the second robot 102, make a request for task support, and transmit information related to the user requests to the second robot 102. The task support in response to the call of the first robot 101 can be a duty of the second robot 102.

According to the present embodiment, the first robot 101 and the second robot 102 can also communicate with the control server 11.

The first robot 101 and the second robot 102 can transmit various types of information such as state information to the control server 11, and the control server 11 can monitor and control the state of the first robot 101 and the second robot 102 and a current state of tasks assigned to the first robot 101 and the second robot 102.

In this case, the control server 11 can also transmit and receive information to and from a server 15 of a product or service provider such as an airport or a hotel. For example, the control server 11 can receive information related to the airport or the hotel from the server 15 of the product or service provider such as the airport or the hotel, and can transfer information required to perform the task to the first robot 101 and/or the second robot 102.

The control server 11 can be an RSDP 10 according to an embodiment of the present disclosure or can be one of the servers included in the RSDP 10. Accordingly, the operation of the control server 11 described above with reference to FIGS. 8A and 8B can be performed by the RSDP 10. As described above, the RSDP 10 can be configured as a plurality of servers, to which information and functions are distributed, or as a single integrated server.

In FIGS. 8A and 8B, the first robot 101 and the second robot 102, which cooperate with each other, can be the same type. Alternatively, the first robot 101 and the second robot 102 can be different types. For example, the first robot 101 can be the guide robot 100a for guiding a user to a predetermined destination, and the second robot 102 can be the porter robot 100c1 that moves while carrying a load of the user.

A robot can have varying hardware performances and can provide different services depending on the type thereof. Different types of robots can be combined to cooperate with each other, and thus more various and abundant services can be provided.

According to the present disclosure, cooperation between robots can be achieved at an airport or a hotel, and intervention of an administrator can be minimized when the cooperative task is performed, and thus administration cost and time can be reduced, thereby improving use convenience.

Figure 9:
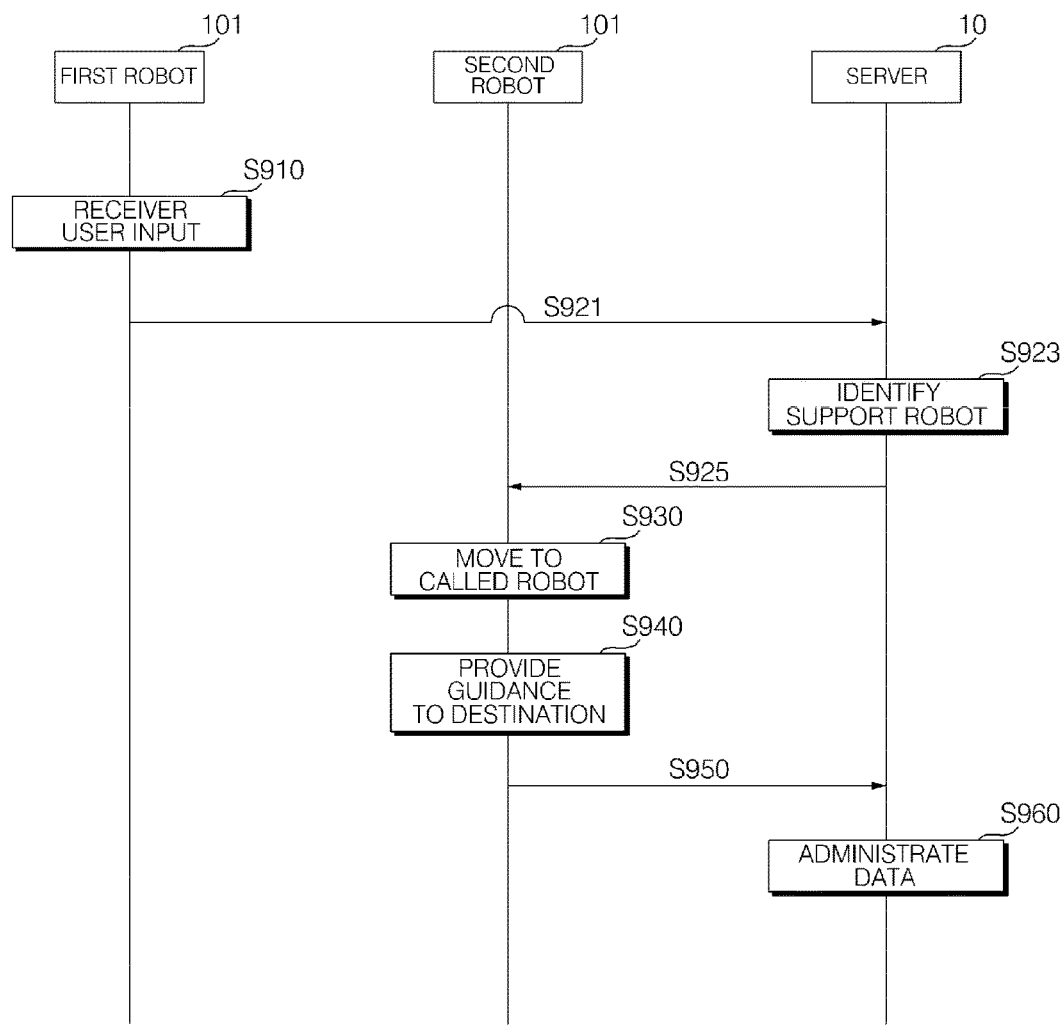
FIG. 9 is a flowchart illustrating a method of controlling a robot system according to an embodiment of the present disclosure.

FIG. 9 is a flowchart illustrating a method of controlling a robot system according to an embodiment of the present disclosure.

Referring to FIG. 9, the first robot 101 can receive user input including a predetermined service request (S910). For example, the first robot 101 can receive user touch input or user speech input and can identify a service corresponding to the user input.

The first robot 101 can transmit information based on the user input to the server 10 (S921). Here, the information based on the user input can include information on a location of the first robot 101 or the place at which the service is provided and user requests. For example, when a user makes a request for a guidance service for guidance while moving to a predetermined gate, the first robot 101 can transmit information on the current position of the first robot 101, destination information, and guidance service request information to the server 10.

The server 10 can identify a support robot capable of supporting a task corresponding to the service request (S923).

The server 10 can select the support robot among a plurality of robots included in the robot system based on at least one of whether the robots currently perform tasks, the distances between the robots and the first robot 101, or a time at which the robot is expected to finish the current task.

For example, the server 10 can select a robot that finishes the task and stands by as the support robot. When a plurality of robots stands by, the server 10 can select a robot closest to the first robot 101 as the support robot among the robots that stand by.

When all of the robots currently perform the tasks, the server 10 can select a robot expected to finish the task the earliest as the support robot.

When a robot on standby is far away and the sum of the time at which a robot that is performing a task is expected to finish the task and the time taken for the robot that is performing the task to move to the place at which the first robot 101 is located is less than the time taken for the robot that stands by to move to the place at which the first robot 101 is located, the robot that is performing the task can be selected as the support robot.

According to the present disclosure, it is possible to select a support robot suitable for performing a task corresponding to the user request service and to efficiently administrate robots.

The server 10 can determine the second robot 102 as the support robot according to the aforementioned reference.

The first robot 101 and the second robot 102 can be the same type. Alternatively, the first robot 101 and the second robot 102 can be different types. For example, the first robot 101 can be the guide robot 100a for providing guidance to a predetermined destination and the second robot 102 can be the porter robot 100c1 for moving while carrying a load of the user.

The porter robot 100c1 can travel autonomously, can travel while following a target, and can support a load delivery service, a guidance service, or the like.

The server 10 can make a request to the second robot 102 identified to be the support robot for a task such as a guidance service or load delivery (S925).

In this case, a signal transmitted while the server 10 makes a request to the second robot 102 for the support task can include information on the support task. For example, the signal can include information on the location of the first robot 101, the place at which the service is provided, information on user requests, and surrounding environment information.

Then, the second robot 102 can perform the task (S940). For example, the second robot 102 can guide the user to a destination. When the user has a load, the second robot 102 can carry the user load to the destination.

In some embodiments, the second robot 102 can stand by in the same area as the first robot 101. In this case, the second robot 102 can immediately perform the support task.

However, the second robot 102 can guide people to service usage, can perform other tasks, or can return to a waiting position while traveling autonomously.

As such, when the second robot 102 needs to be moved to start a service, the second robot 102 can move to a calling place included in the support task (S930).

Because the user makes a request for a service through the first robot 101, the user can be frequently positioned adjacent to the first robot 101. Accordingly, a calling place can be frequently a position in which the first robot 101 is positioned. Accordingly, the second robot 102 can move to the position in which the first robot 101 is positioned (S930).

After the task is finished, the second robot 102 can report task completion to the server 10 (S950). The task completion report can include information on whether the task is successfully performed, the details of the task, and the time taken to perform the task.

The server 10 that receives the task completion report can update data corresponding to the first robot 101 and the second robot 102 based on the task completion report and can administrate the data (S960). For example, the number of times that the first robot 101 and the second robot 102 perform the task can be increased, and information on the details of the task, such as the type of the task and the time taken to perform the task, can also be updated.

The second robot 102 that completes task completion can travel autonomously and can return to a predetermined position according to settings.

Figure 10:
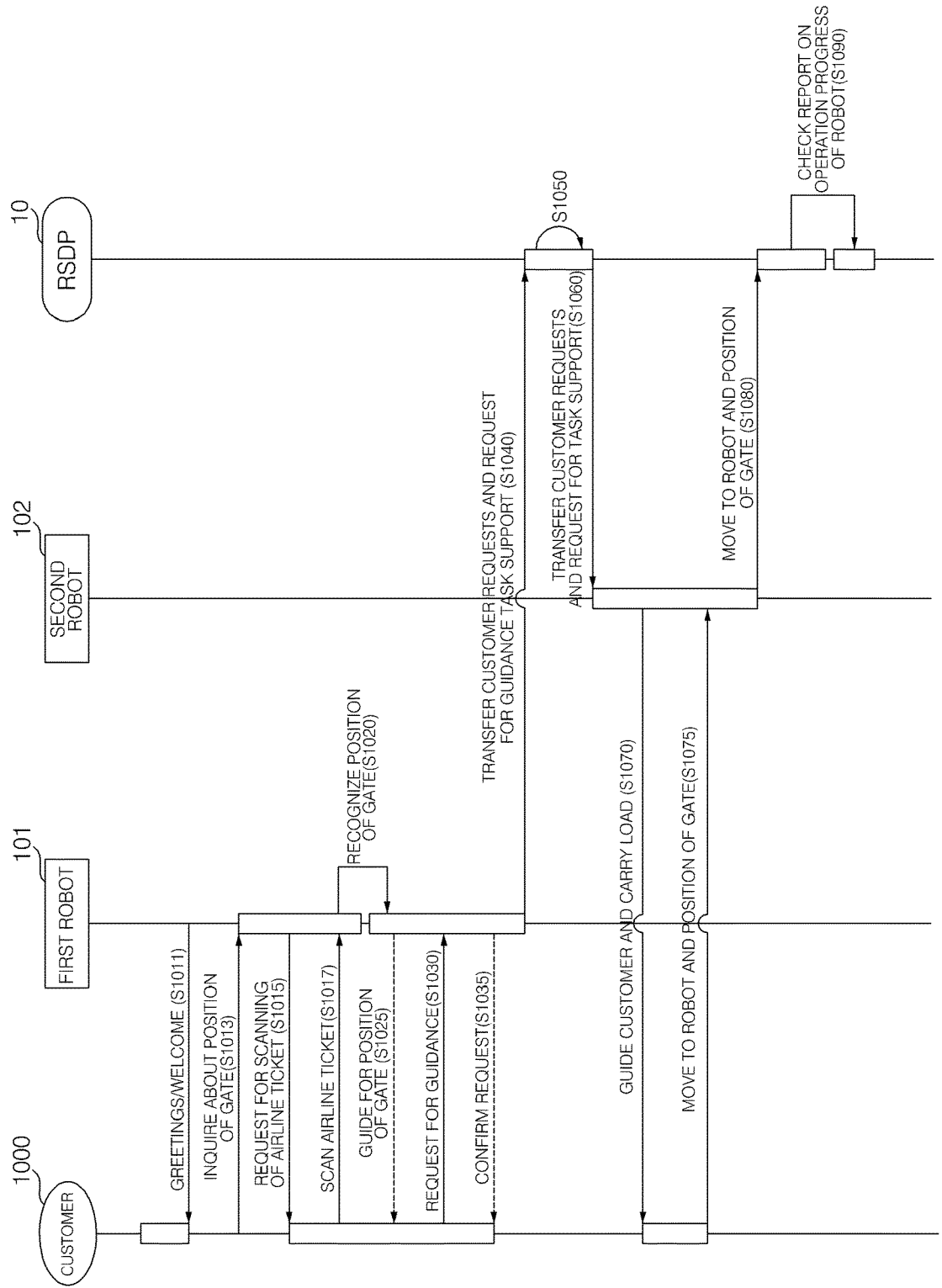
FIG. 10 is a flowchart illustrating a method of controlling a robot system disposed at an airport according to an embodiment of the present disclosure.

FIG. 10 is a flowchart illustrating a method of controlling a robot system disposed at an airport according to an embodiment of the present disclosure and illustrates an example of the case in which a customer is guided for a gate position by scanning an airline ticket and a guidance service is used.

Referring to FIG. 10, upon determining a customer 1000 approaches within a predetermined range based on an image acquired through the image acquisition unit 120, the first robot 101 can output a greeting message for welcoming the customer 1000 in the form of an image and/or speech (S1011).

The customer 1000 can select a menu displayed on the display 182 of the first robot 101 or can inquire about a gate position in the form of speech (S1013).

The first robot 101 can make a request for scanning of an airline ticket for more accurate guidance (S1015).

When the customer 1000 inserts the airline ticket into a scanner slot (S1017), the first robot 101 can recognize the airline ticket, can identify gate information included in the airline ticket, and can recognize a position of the corresponding gate (S1020), and can provide guidance to the recognized gate position in the form of an image and/or speech (S1025).

The customer 1000 can make a request for a guidance service to the guided gate (S1030), and the first robot 101 can transfer customer requests to the server 10 and can make a request for guidance task support (S1040).

According to settings, the first robot 101 can receive confirmation of the guidance service request from the customer 1000 (S1035).

The server 10 can identify a support robot for supporting the guidance service task requested by the first robot 101 according to a predetermined reference (S1050).

When the second robot 102 is selected as the support robot, the server 10 can transmit the customer requests to the second robot 102 and can make a request for guidance task support (S1060).

Accordingly, the second robot 102 can perform a customer guidance service and a task for carrying a load (S1070), and when the second robot 102 completely moves to the gate position as a destination (S1075), the second robot 102 can report guidance task completion to the server 10 (S1080).

The server 10 can check the operation result report of the first robot 101 and the second robot 102 and can store and administrate data (S1090).

Figure 11:
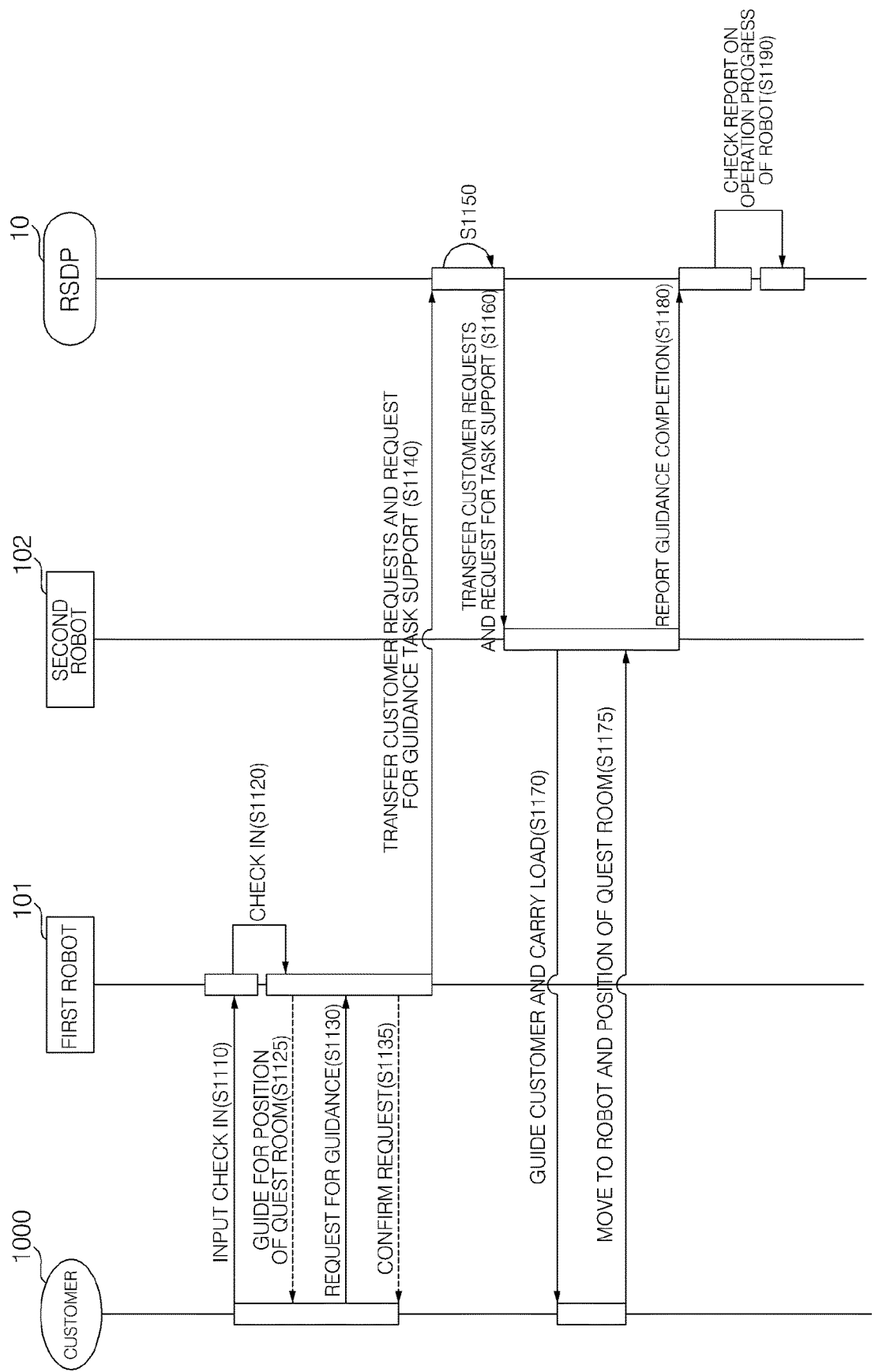
FIG. 11 is a flowchart illustrating a method of controlling a robot system disposed in a hotel according to an embodiment of the present disclosure.

FIG. 11 is a flowchart illustrating a method of controlling a robot system disposed in a hotel according to an embodiment of the present disclosure and illustrates an example of the case in which a customer is guided for a position of a guest room and a guidance service is used for check in.

Referring to FIG. 11, upon determining that the customer 1000 approaches within a predetermined range based on an image acquired through the image acquisition unit 120, the first robot 101 can output a greeting message for welcoming the customer 1000 in the form of an image and/or speech (S1011).

The customer 1000 can check in by selecting a menu displayed on the display 182 or the first robot 101 or using speech (S1110) and the first robot 101 can verify check-in information (S1120).

Alternatively, the customer 1000 can check in with staff and the staff can input check-in information to the server 10. In this case, the server 10 can transmit the check-in information to the first robot 1101.

The first robot 101 can recognize the position of the guest room corresponding to the check-in information (S1120). The first robot 101 can provide guidance to the recognized position of the guest room in the form of an image and/or speech (S1125).

The customer 1000 can make a request for a guidance service to the guided guest room (S1130), and the first robot 101 can transfer customer requests to the server 10 and make a request for guidance task support (S1140). In this case, the first robot 101 can also receive confirmation of the guidance service request from the customer 1000 (S1135).

The server 10 can determine the support robot for supporting the guidance service task requested by the first robot 101 according to a predetermined reference (S1150).

After the second robot 102 is selected as a support robot, the server 10 can transfer customer requests to the second robot 102 and can make a request for guidance task support (S1160).

Accordingly, the second robot 102 can perform a customer guidance service and a task for carrying a load (S1170), and when the second robot 102 finishes moving to the gate position, which is the destination (S1175), the second robot 102 can report guidance task completion to the server 10 (S1180).

The server 10 can check a report on the result of operation of the first robot 101 and the second robot 102 and can store and administrate data (S1190).

According to an embodiment of the present disclosure, whether a user has a load can be identified based on an image acquired through the image acquisition unit 120, and cooperative work can be performed according to whether a load is present and the number of items in the load.

Figure 12:
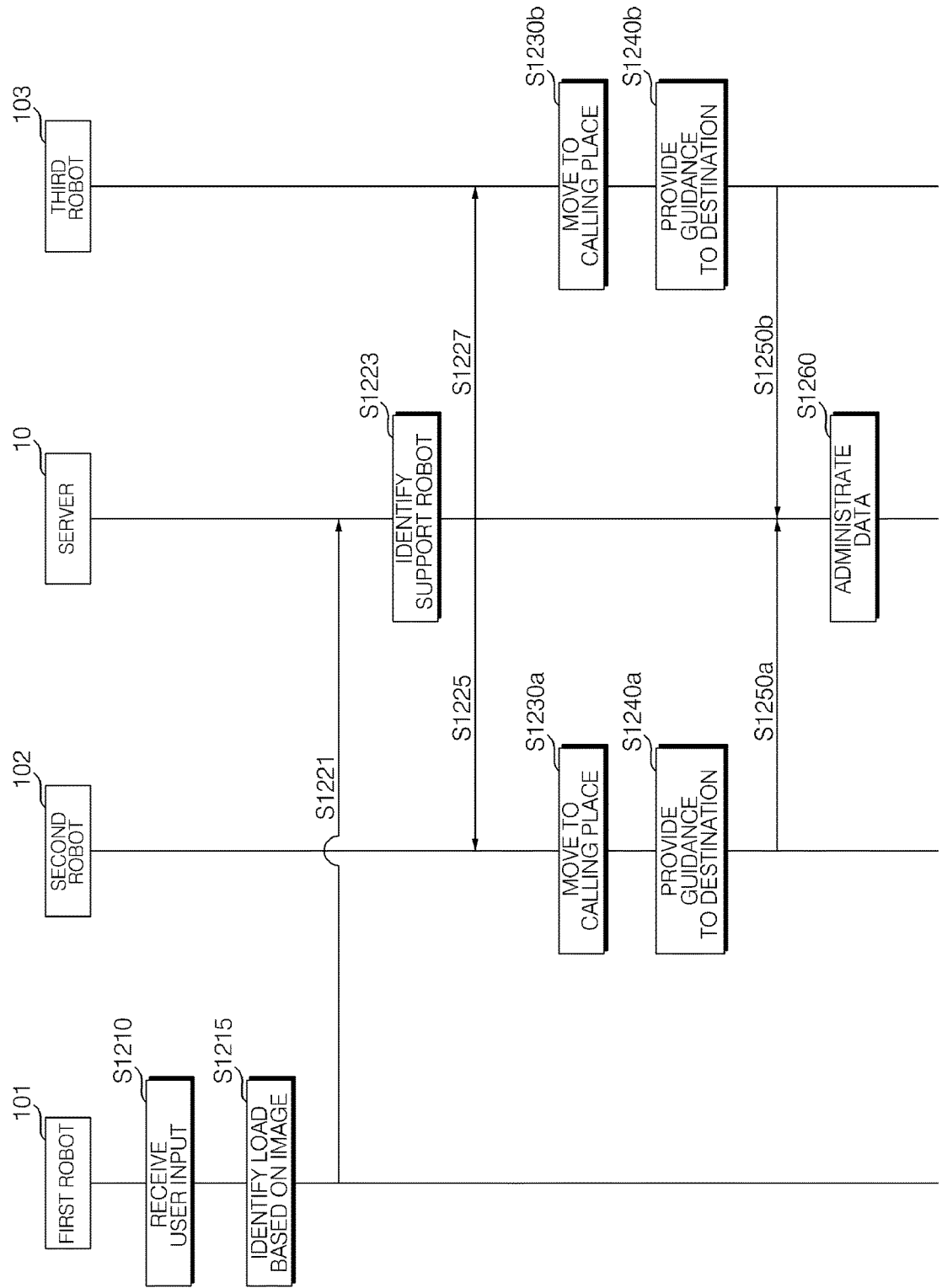
FIG. 12 is a flowchart illustrating a method of controlling a robot system according to an embodiment of the present disclosure.

FIG. 12 is a flowchart illustrating a method of controlling a robot system according to an embodiment of the present disclosure.

Referring to FIG. 12, the first robot 101 can receive user input including a request for a predetermined service (S1210). The load of the user who makes a request for a service can be identified based on the image acquired through the image acquisition unit 120 (S1215).

For example, the image acquisition unit 120 can acquire an image of the vicinity of the first robot 101 and the vicinity of the user, the controller 140 can identify whether a baggage in a user hand, an article carried by holding a handle of a bag, and a baggage, a bag, and an article are present within a predetermined distance from a user leg, from the acquired image.

The first robot 101 can transmit information based on the user input to the server 10 (S1221). In addition, the first robot 101 can transmit information on the identified load to the control server 10 (S1221). That is, information transmitted to the server 10 by the first robot 101 can include information on user requests and information on the identified load.

The server 10 can determine the support robot for supporting a task corresponding to the service request (S1223).

The server 10 can select the type and number of support robots based on the identified load.

The server 10 can select the support robot among the type of robots selected based on the identified load based on at least one of whether the plurality of robots currently perform tasks, the distances between the robots and the first robot 101, or a time at which the robot is expected to finish the current task.

For example, when the identified load is a single baggage with a first size, a request for a support task can be made to the second robot 102 that is capable of carrying the baggage with the first size (S1225).

When the identified load is a lager load than the first size or a plurality of pieces of baggage, a request for a support task can be made to a third robot 103 that is capable of carrying a baggage larger than the first size (S1227).

When a user load is not identified to be present, an optimal robot can be selected as a support robot in consideration of distance and time factors. For example, any one of robots for making a request for a service requested by the user such as a guidance service can be selected according to a predetermined reference irrespective of the type and function of a robot.

As necessary, the second robot 102 or the third robot 103 can move to a calling place included in the support task (S1230a and S1230b).

The second robot 102 or the third robot 103 can perform the support task (S1240a and S1240b). For example, the second robot 102 or the third robot 103 can guide the user to a destination. When the user has a load, the second robot 102 or the third robot 103 can carry the load of the user to the destination.

After the task is completed, the second robot 102 or the third robot 103 can report task completion to the server 10 (S1250a and S1250b). The task completion report can include information on whether the task is successfully performed, the details of the task, and the time taken to perform the task.

The server 10 that receives the task completion report can update data corresponding to robots that performs cooperative work based on the task completion report (S1260).

Figure 13:
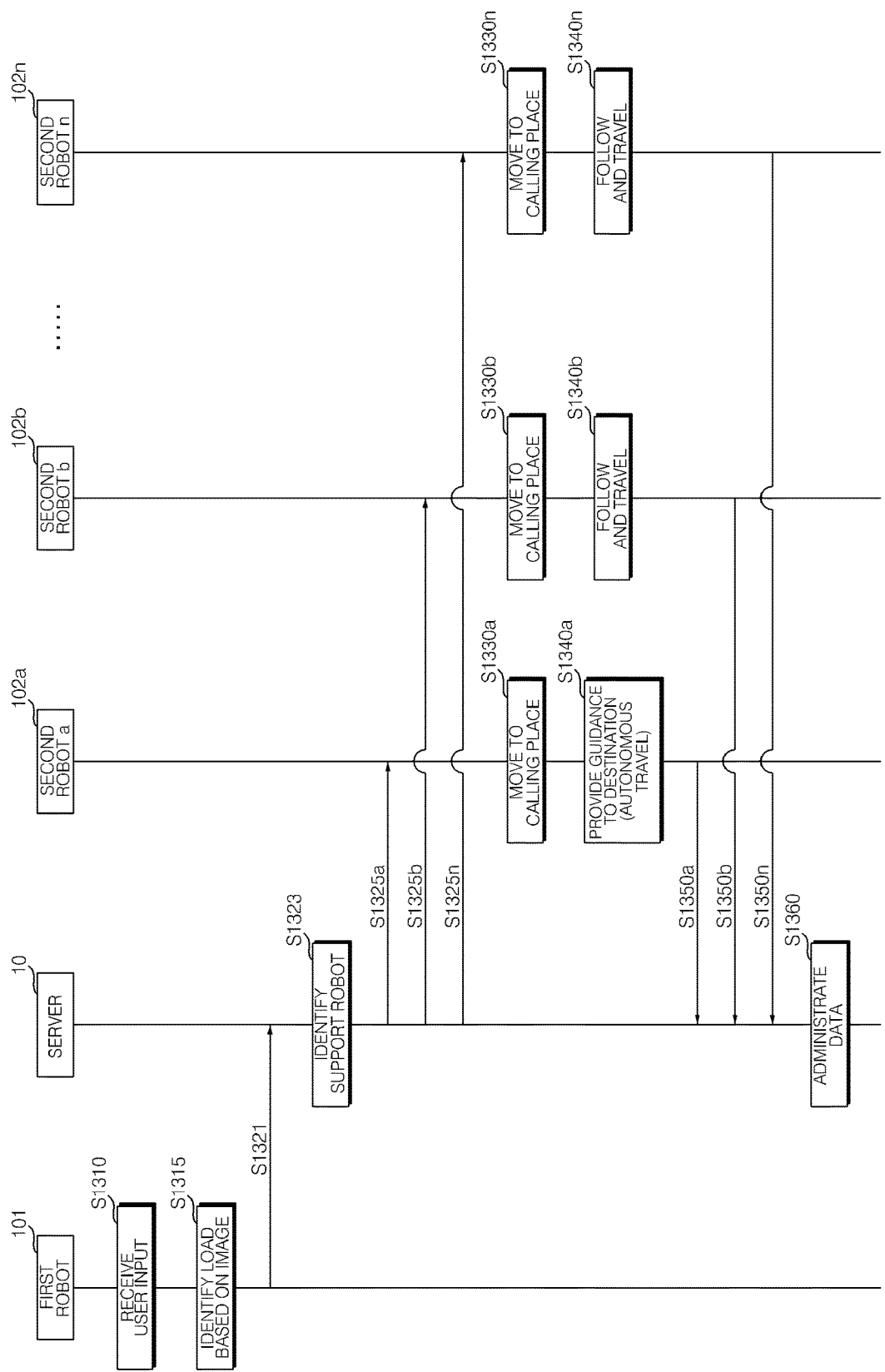
FIG. 13 is a flowchart illustrating a method of controlling a robot system according to an embodiment of the present disclosure.

FIG. 13 is a flowchart illustrating a method of controlling a robot system according to an embodiment of the present disclosure.

Referring to FIG. 13, the first robot 101 can receive user input including a predetermined service request (S130) and can identify a load of a user who makes a request for the service base on an image acquired through the image acquisition unit 120 (S1315).

The first robot 101 can transmit information based on the user input to the server 10 (S1321). The first robot 101 can transmit information on the identified load to the control server 10 (S1321). That is, information transmitted to the server 10 by the first robot 101 can include information on the user requests and information on the identified load.

The server 10 can identify the support robot for supporting a task corresponding to the service request (S1323).

In this case, the server 10 can select the type and number of support robots based on the identified load. For example, the server 10 can determine that n second robots for carrying the identify load is required.

In this case, the server 10 can make a request to the n second robots 102a, 102b. 102n including a second robot a 102a, a second robot b 102b . . . a second robot n 102n for task support (S1325a, S1325b . . . S1325n).

If necessary, the second robots 102a, 102b . . . 102n can move to a calling place included in the support task (S1330a, S1330b . . . S1330n).

The second robots 102a, 102b . . . 102n can perform the support task (S1340a, S1340b . . . S1340n). For example, the second robots 102a, 102b . . . 102n can guide the user to a destination.

As such, when a plurality of second robots is selected as the support robot, any one of the robots can travel autonomously, and the other robots can follow the user by following the robot that travels autonomously.

For example, the second robot a 102a can guide the user to the destination while travels autonomously, and the other second robots 102b . . . 102n can follow the user from a predetermined distance based on the second robot a 102a. The other second robots 102b . . . 102n can follow the user. Following travel is simpler than autonomous traveling, and thus robot that performs following travel can efficiently use system resources.

After the task is completed, the second robots 102a, 102b . . . 102n can report task completion to the server 10 (S1350a, S1350b . . . S1350n). The task completion report can include whether a task is successfully performed, a time taken to perform the task, or the like.

The server 10 that receives the task completion report can update data corresponding to robots that perform cooperative work and can administrate the data based on the task completion report (S1360).

Figure 14:
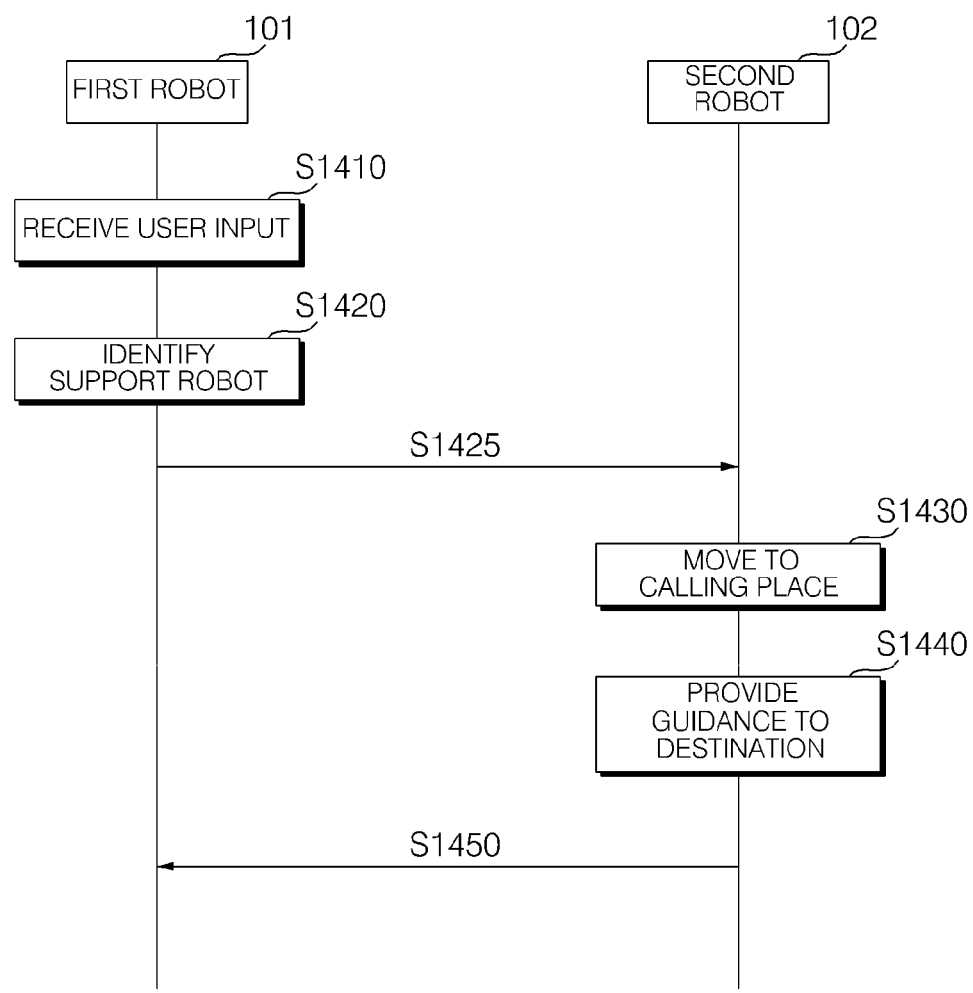
FIG. 14 is a flowchart illustrating a method of controlling a robot system according to an embodiment of the present disclosure.

FIG. 14 is a flowchart illustrating a method of controlling a robot system according to an embodiment of the present disclosure.

Referring to FIG. 14, the first robot 101 can receive user input including a predetermined service request (S1410). For example, the first robot 101 can receive user touch input or speech input and can identify a service corresponding to the user input.

Alternatively, the first robot 101 can also receive a signal including the user request from the server 10.

When task support is required, the first robot 101 can directly call another type of second robot 102 and can make a request for task support (S1425). For example, the first robot 101 can be the guide robot 100a for providing guidance to a predetermined destination to a user, and the second robot 102 can be the porter robot 100c1 that moves while carrying a load of the user. In this case, for load delivery, the guide robot 100a can make a request to the porter robot 100c1 for task support.

According to the present embodiment, the first robot 101 can directly call another robot and can make a request for task support based on the service requested by the user (S1425).

In addition, the first robot 101 can directly check the current state information of robots, and can identify a support robot for supporting the task (S1420). For example, the first robot 101 can select the support robot among the robots based on at least one of whether the robots currently perform tasks, the distances between the robots and the first robot 101, or a time at which the robots are expected to finish the current tasks.

To this end, the first robot 101 can receive state information of the robots from the control server 11.

Alternatively, the first robot 101 can transmit a signal for making a request for the task support to other robots, and can select the support robot among the robots that transmit a response signal In this case, the signal transmitted by the first robot 101 can include a location of the first robot 101 or a position in which a service is provided, and information on user requests. In addition, the response signal transmitted by the robots can include location information and state information of the robots.

The first robot 101 can check information included in the response signal and can select the support robot according to a predetermined reference. In the present embodiment, cooperation can be advantageously provided even if an error occurs in the server 10 or if communication between the server 10 and the first robot 101 is poor.

Accordingly, a support robot suitable to perform a task corresponding to the service can be selected and robots can be effectively administrated.

The first robot 101 can transmit information based on the user input while making a request to the second robot 102 for task support (S1425). Here, the information based on the user input can include information on the location of the first robot 101 or the place at which the service is provided and user requests. For example, when a user makes a request a guidance service of guiding the user while moving to a predetermined gate, the first robot 101 can transmit current location information of the first robot 101, destination information, guidance service request information, or the like to the server 10.

The second robot 102 is called as the support robot can perform a task corresponding to the user request (S1440). For example, the second robot 102 can guide the user to a destination. When the user has a load, the second robot 102 can carry the load of the user to the destination.

In some embodiments, the second robot 102 can stand by in the same area as the first robot 101. In this case, the second robot 102 can immediately perform task support.

Alternatively, when the second robot 102 needs to be moved to start a service, the second robot 102 can move to a calling place included in the support task (S1430). Here, the calling place can be a position in which the first robot 101 is positioned.

After the task is completed, the second robot 102 can report task completion to the first robot 101 (S1450). The task completion report can include information on whether the task is successfully performed, and the time taken to perform the task.

The first robot 101 can report task completion to the server 10. The server 10 that receives the task completion report can update data corresponding to the first robot 101 and the second robot 102 and can administrate the data based on the task completion report.

Figure 15:
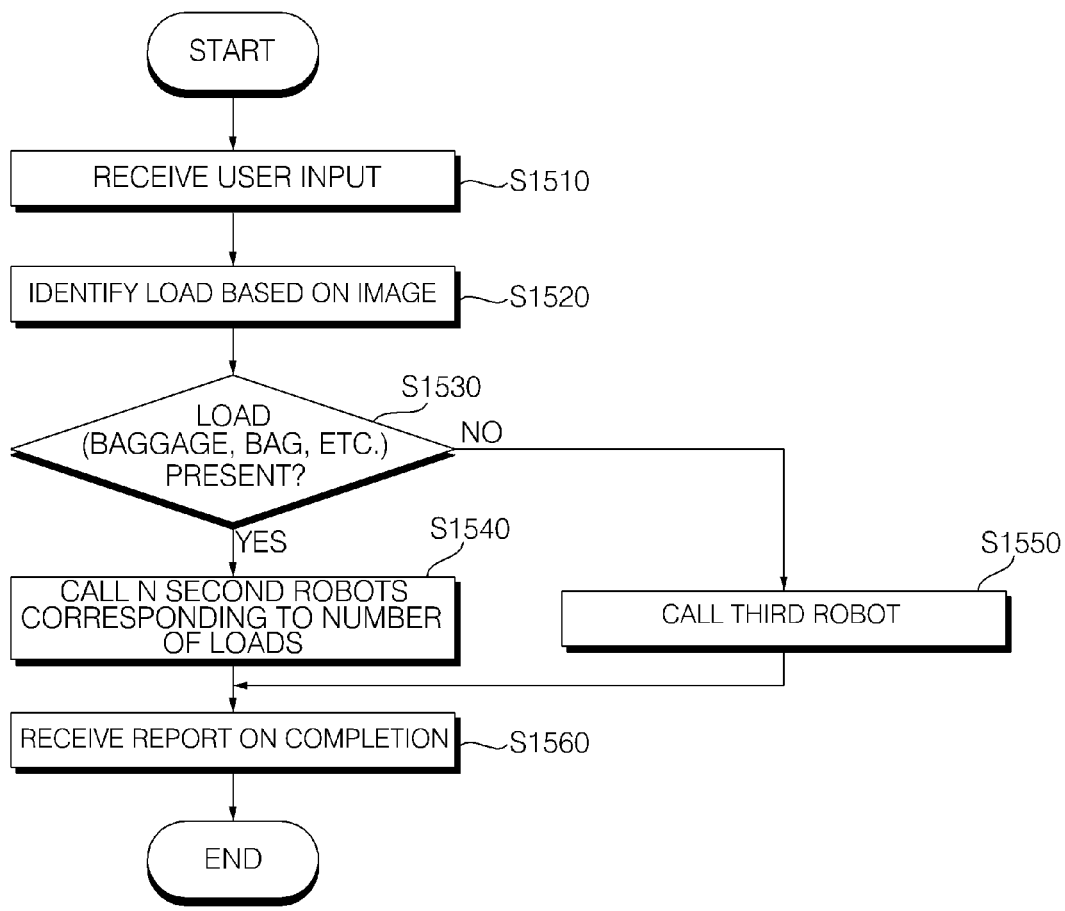
FIG. 15 is a flowchart illustrating method of controlling a robot system according to an embodiment of the present disclosure.

FIG. 15 is a flowchart illustrating method of controlling a robot system according to an embodiment of the present disclosure and illustrates an operation of a first robot for receiving a user request and making a request for task support.

Referring to FIG. 15, the first robot 101 can receive user input including a predetermined service request (S1510) and can identify a load of the user who makes a request for a service based on an image acquired through the image acquisition unit 120 (S1520).

For example, the image acquisition unit 120 can acquire an image of vicinity of the first robot 101 and an image of the vicinity of the user, and the controller 140 can identify whether a baggage in a user hand, an article carried by holding a handle of a bag, and a baggage, a bag, and an article are present within a predetermined distance from a user leg, from the acquired image.

The first robot 101 can call another robot according to whether the load is present and the number and size of items in the load (S1540 and S1550).

For example, the first robot 101 can call a porter robot for providing a carry service of identifying a user load such as a baggage or a bag, as the second robot (S1540).

In this case, N porter robots can be called according to the number and size of the load (S1540).

As such, when a plurality of second robots is selected as the support robot, any one of the robots can travel autonomously, and the other robots can follow the user by following the robot that travels autonomously. Following travel is simpler than autonomous traveling, and thus robot that performs following travel can efficiently use system resources.

When a load is not identified to be present, the first robot 101 can call another type of third robot without a carrying function (S1550).

When the called support robot completes the task, task completion can be reported to the first robot 101 (S1560). The first robot 101 can check and store information on the task completion report.

The first robot 101 can report task completion to the server 10. The server 10 that receives the report on the task completion can update data corresponding to the first robot 101 and the second robot 102 based on the task completion report and can administrate the data. Accordingly, data related to the robots can be effectively administrated, and the server 10 can analyze and learn the data related to the robots.

FIGS. 16 to 20 are reference views illustrating the operation of the robot system according to the embodiment of the present disclosure.

Figure 16:
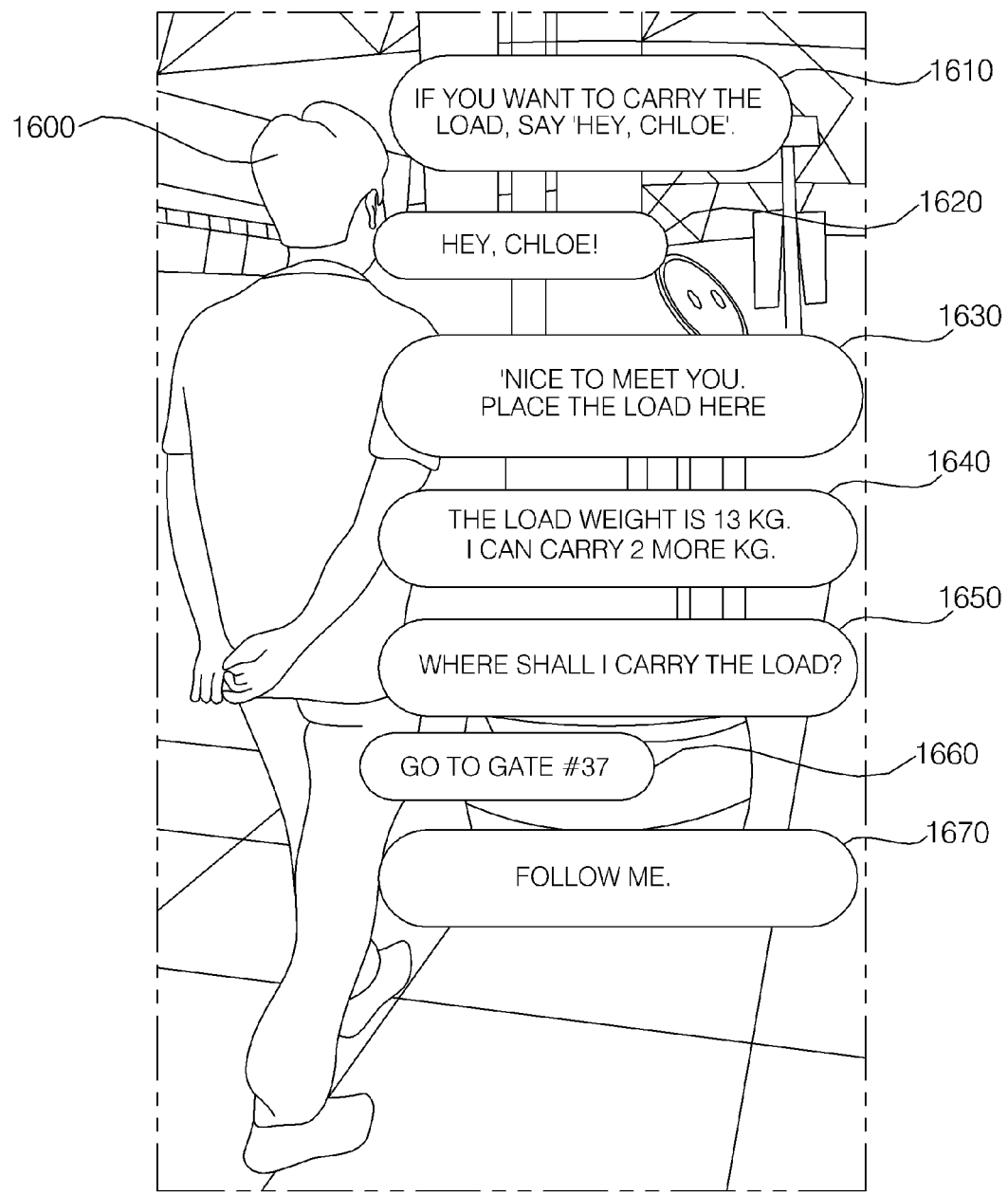
FIGS. 16 to 20 are reference views illustrating the operation of the robot system according to the embodiment of the present disclosure.

Referring to FIG. 16, the porter robot 100c1 can induce service use while traveling autonomously in a service place such as an airport.

For example, the porter robot 100c1 can output a calling expression such as "If you want to carry the load, say 'Hey, Chloe'.", and a speech guidance message 1610 for providing guidance for a method of using service through the sound output unit 181 while traveling autonomously in an airport.

When a customer utters speech including the calling expression, the porter robot 100c1 can stop and can output a speech guidance message such as "Give me a heavy load" or "Where shall I guide you?".

For example, when the customer says 'Hey, Chloe' (1620), the porter robot 100c1 can output a speech guidance message 1630 such as 'Nice to meet you. Place the load here.".

Alternatively, the porter robot 100c1 can move to a place in which a customer is positioned for task support in response to calling of the guide robot 100a. In this case, the guide robot 100a can respond to the aforementioned first robot 101 and the porter robot 100c1 can respond to the aforementioned second robot 102.

When the customer place a load on the porter robot 100c1, the porter robot 100c1 can detect the load using a weight sensor and can utter speech guidance messages 1630 and 1640 such as "The load weight is 13 kg. I can carry 2 more kg.", or "Where shall I carry the load?", and thus can induct destination input.

When the porter robot 100c1 acquires information on a flight to be used by the customer by scanning an airline ticket of the customer or using user input, the porter robot 100c1 can recognize a baggage reference of the flight to be used by the customer.

When the baggage weight limit of the flight of the customer is 15 kg and a load weight detected by the weight sensor is 13 kg, the porter robot 100c1 can utter the speech guidance message 1630 such as "The load weight is 13 kg. I can carry 2 more kg.".

When the load weight detected by the weight sensor exceeds the baggage reference of the flight of the customer, the porter robot 100c1 can output a message for providing guidance for overweight based on the baggage reference. In addition, the porter robot 100c1 can provide guidance to additional fee due to overweight based on the baggage reference or can indicate a position of a check-in counter of a corresponding airline and can ask whether the customer uses a guidance service to the check-in counter of the corresponding airline.

When the customer says a destination such as "Go to Gate 00" and makes a request for a guidance service (1660), the porter robot 100c1 can start leading the way. Upon starting leading the way, the porter robot 100c1 can utter a speech guidance message 1670 for providing guidance for a path to a destination such as "please follow me", for providing other information, or for attracting attention.

After arriving at the destination, when the customer unloads a baggage, the porter robot 100c1 can travel autonomously to the original place after exchanging greetings.

Figure 17:
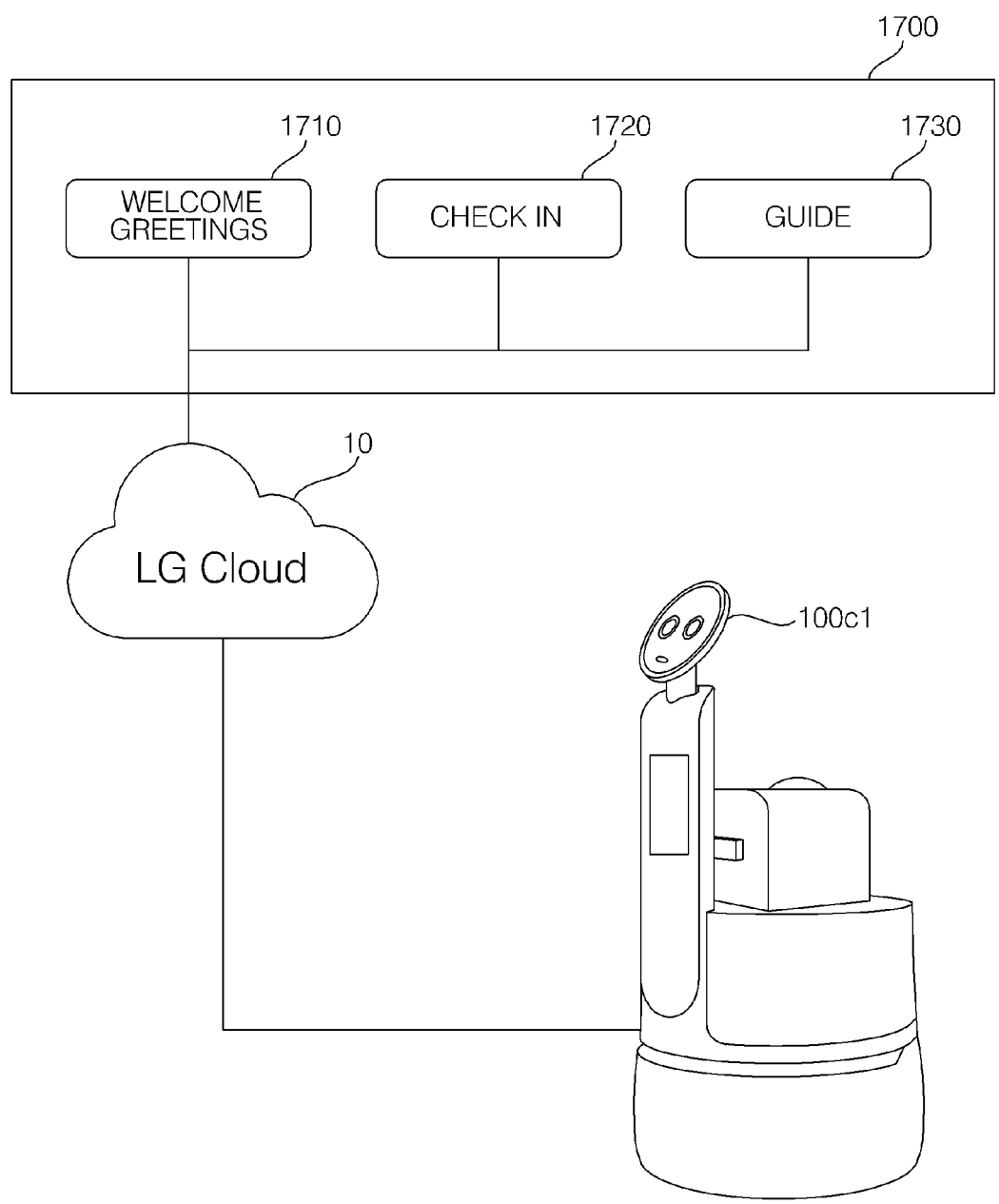

Referring to FIG. 17, when the porter robot 100c1 is operated in a hotel or a resort, an administrator can input, to the server 10, settings 1700 related to a function provided by the porter robot 100c1 in the hotel or the resort. For example, the administrator can set a robot operation schedule, welcome greetings 1710, a check-in function 1720, and a guidance function 1730.

The porter robot 100c1 can download an operation schedule determined by the administrator and updated content from the server 10.

The porter robot 100c1 can stand by at a specific place such as a side of a check-in counter or can stand by while traveling in a predetermined area.

When a guest checks in, the porter robot 100c1 can be operatively associated with check-in information and can be activated or can move to a specific place such as a side of a check-in counter.

For example, the porter robot 100c1 can be activated based on the check-in information received from the server 10.

Alternatively, the porter robot 100c1 can be activated in response to a task support request from another robot such as the guide robot 100a. In this case, the guide robot 100a can respond to the aforementioned first robot 101, and the porter robot 100c1 can respond to the aforementioned second robot 102.

Figure 18:
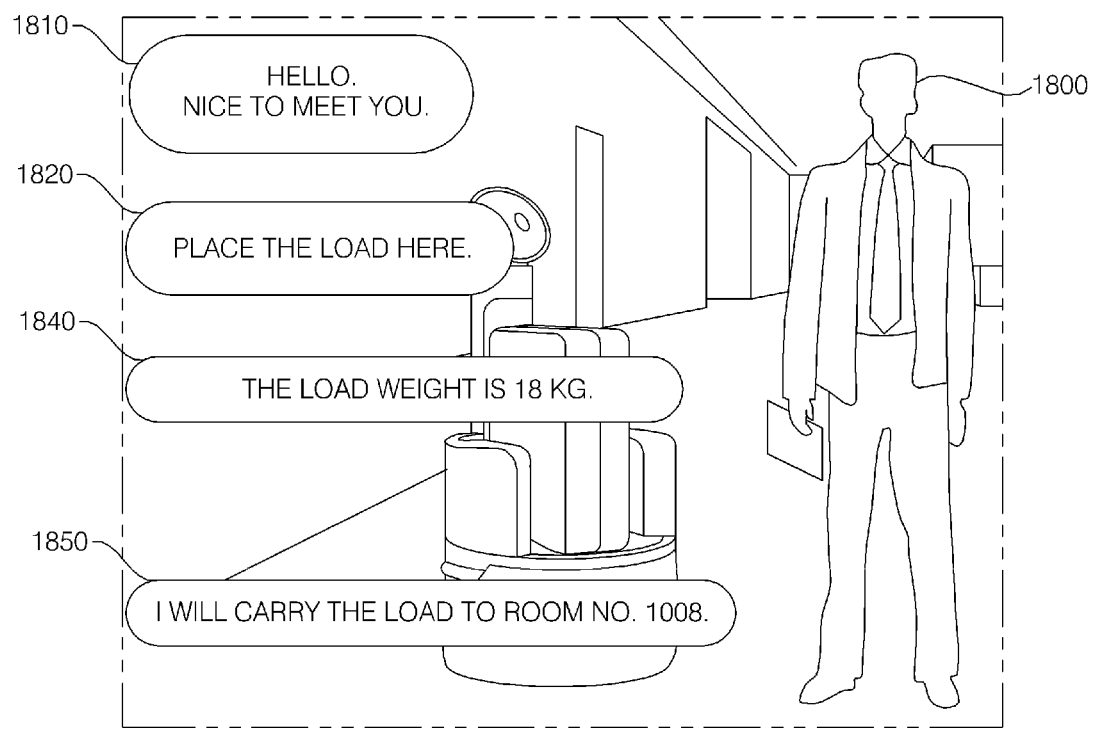

Referring to FIG. 18, the porter robot 100c1 can utter, to a customer 1800, a welcome greeting speech guidance message 1820 set in the welcome greetings 1710 such as "Hello." or "Nice to meet you" through the sound output unit 181.

Then, the porter robot 100c1 can utter a speech guidance message 1820 for providing guidance for information indicating that a load is allowed to be placed on a service module 160c1 of the porter robot 100c1, such as "Place the baggage on me.".

The porter robot 100c1 can be operatively associated with the check-in information and can recognize information on a guest room of a customer 1800.

Thus, when the customer 1800 places the load on the porter robot 100c1, the porter robot 100c1 can sense the load using a weight sensor and can utter speech guidance messages 1830 and 1840 for providing guidance for the load and the guest room such as "The load weight is 18 kg." or "I will carry the load to room No. 1008".

Figure 19:
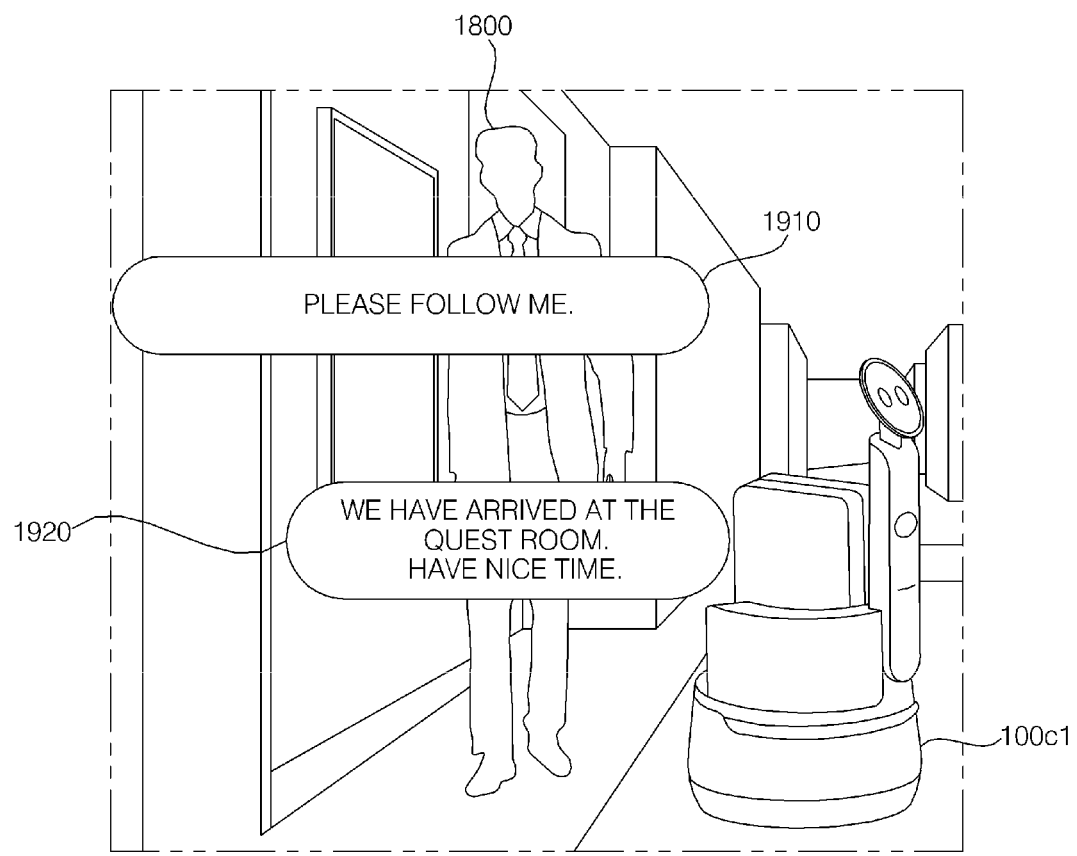

Referring to FIG. 19, the porter robot 100c1 can start leading the way while moving. When starting leading the way, the porter robot 100c1 can utter a speech guidance message 1910 for providing guidance for a path to a destination such as "Follow me", for providing other information, or for calling attention.

In some embodiments, the server 10 can automatically call an elevator along a path to the guest room of the porter robot 100c1. Alternatively, when the porter robot 100c1 arrives within a predetermined distance from the elevator, the porter robot 100c1 can call the elevator through the server 10.

When arriving in front of the guest room, the porter robot 100c1 can utter a speech guidance message 1910 indicating arrival at the guest room and including preset greetings.

Figure 20:
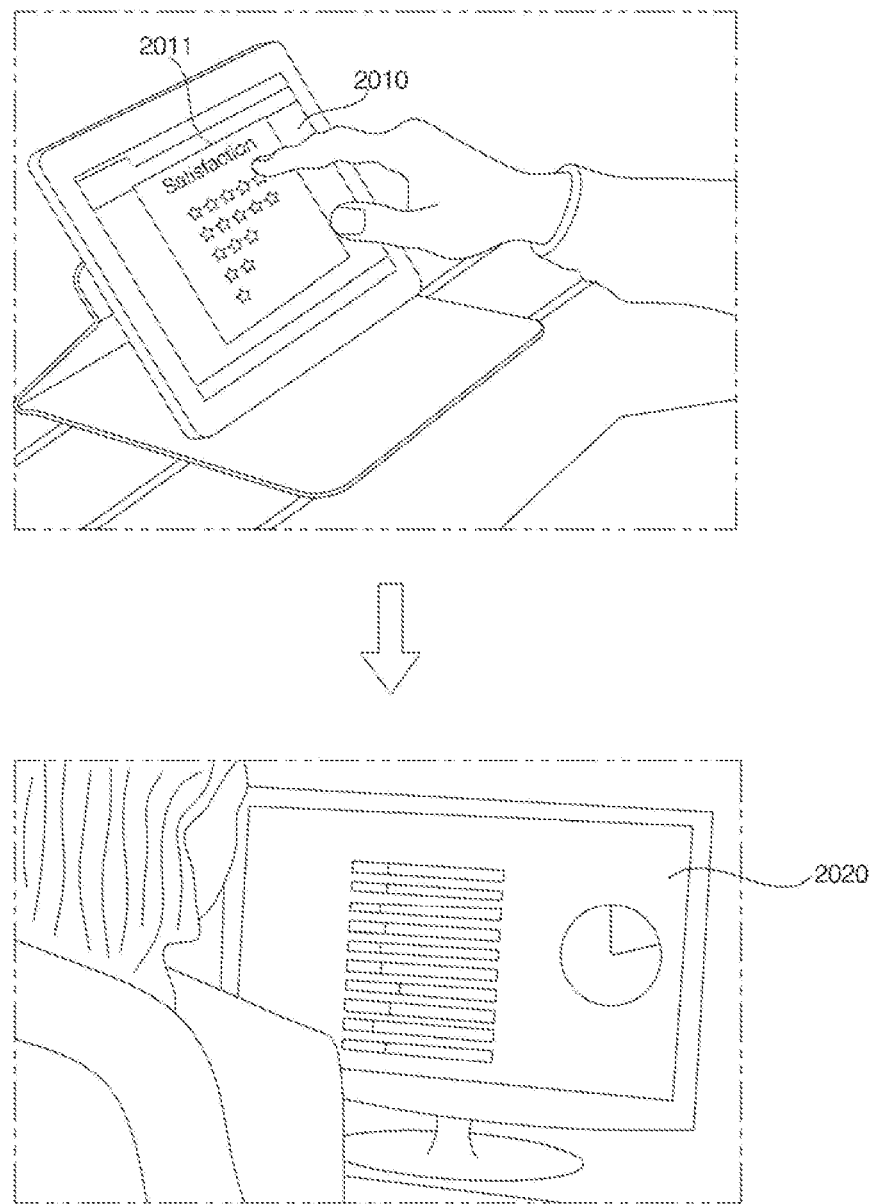

Referring to FIG. 20, a customer 1800 using a guidance service can estimate a satisfaction level for a guidance service from a service estimation image 2010 using a terminal of the customer or a device 2010 disposed in the guest room. The administrator can verify a situation in which the porter robot 100c1 completes the guidance service by the customer and estimation of the satisfaction level of the customer from an administrator image 1020.

The robot system according to the present disclosure and the method of controlling the same are not limitedly applied to the constructions and methods of the embodiments as previously described; rather, all or some of the embodiments can be selectively combined to achieve various modifications.

The method of controlling the robot system according to the embodiment of the present disclosure can be implemented as code that can be written on a processor-readable recording medium and thus read by a processor. The processor-readable recording medium can be any type of recording device in which data is stored in a processor-readable manner. The processor-readable recording medium can include, for example, read only memory (ROM), random access memory (RAM), compact disc read only memory (CD-ROM), magnetic tape, a floppy disk, and an optical data storage device, and can be implemented in the form of a baggage wave transmitted over the Internet. In addition, the processor-readable recording medium can be distributed over a plurality of computer systems connected to a network such that processor-readable code is written thereto and executed therefrom in a decentralized manner.

It will be apparent that, although the preferred embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed:

1. A method of controlling a robot system, the method comprising:
   receiving a user input by a user, the user input including a request for an escort service, by a first robot;
   identifying a load of the user based on an image acquired through an image acquisition unit of the first robot, by the first robot;
   transmitting information based on the user input including the identified load to a server, by the first robot;
   selecting a type and number of second robots based on the identified load for supporting a delivery task corresponding to the identified load, by the server;
   making a request to the selected number of second robots for the delivery task, by the server; and
   performing the delivery task with the escort service, by the selected number of second robots and not the first robot,
   wherein the first robot is different from the second robots.

2. The method of claim 1, wherein the selecting the type and number of second robots includes selecting the number second robots among a plurality of second robots based on at least one of whether the second robots currently perform tasks, distances between the second robots and the first robot, and a time at which the second robots are expected to finish current tasks, by the server.

3. The method of claim 1, further comprising:
   moving the selected number of second robots to a position at which the first robot is positioned.

4. The method of claim 1, further comprising:
   reporting task completion to the server by the selected number of second robots after performing the task.

5. The method of claim 4, further comprising:
updating data corresponding to the first robot and the selected number of second robots based on receiving the report on the task completion, by the server.

6. The method of claim 1, wherein, in the performing the task by the selected number of second robots, when the selected number of second robots is among a plurality of second robots, any one of the selected number of second robots travels autonomously, and a remaining robot of the plurality of second robots follows the second robot that travels autonomously.

7. A method of controlling a robot system, the method comprising:
receiving input including a user request for an escort service of a user, by a first robot;
identifying a load of the user based on an image acquired through an image acquisition unit of the first robot, by the first robot;
selecting a type and number of second robots based on the identified load for supporting a delivery task corresponding to the identified load;
calling the selected number of second robots, by the first robot, the second robots being different than the first robot; and
performing the delivery task with the escort service corresponding to the user request, by the selected number of second robots.

8. The method of claim 7, further comprising:
identifying the number of second robots for performing the task among a plurality of second robots according to a predetermined reference, by the first robot,
wherein the predetermined reference includes at least one of whether a task is currently performed by the selected number of second robots, distances between the second robots and the first robot, and a time at which the selected number of second robots are expected to finish current tasks.

9. The method of claim 7, further comprising:
moving the selected number of second robots to a position at which the first robot is positioned.

10. The method of claim 7, further comprising:
reporting task completion to the first robot by the selected number of second robots after performing the task.

11. The method of claim 10, further comprising:
reporting task completion to a control server by the first robot after performing the task.

12. The method of claim 11, further comprising:
updating data corresponding to the first robot and the selected number of second robots based on receiving the report on task completion, by the control server.

13. The method of claim 7, wherein, in the performing the task by the selected number of second robots, when the selected number of second robots are among a plurality of second robots, any one of the second robots travels autonomously, and a remaining robot among the plurality of second robots follows the second robot that travels autonomously.

14. The method of claim 7, wherein the receiving input including the user request includes receiving user speech input or user touch input corresponding to the user request or receiving a signal including the user request from a server, by the first robot.

* * * * *